United States Patent
Wang et al.

(10) Patent No.: US 11,963,256 B2
(45) Date of Patent: Apr. 16, 2024

(54) SIGNALING OF JOINT ALIGNMENT OF UU DRX AND SL DRX

(71) Applicant: QUALCOMM Incorporated, San Diego, CA (US)

(72) Inventors: Kaidong Wang, San Diego, CA (US); Jelena Damnjanovic, Del Mar, CA (US); Tao Luo, San Diego, CA (US); Junyi Li, Fairless Hills, PA (US); Sony Akkarakaran, Poway, CA (US); Ozcan Ozturk, San Diego, CA (US); Aleksandar Damnjanovic, Del Mar, CA (US)

(73) Assignee: QUALCOMM Incorporated, San Diego, CA (US)

( * ) Notice: Subject to any disclaimer, the term of this patent is extended or adjusted under 35 U.S.C. 154(b) by 240 days.

(21) Appl. No.: 17/452,567

(22) Filed: Oct. 27, 2021

(65) Prior Publication Data

US 2023/0127301 A1   Apr. 27, 2023

(51) Int. Cl.
*H04W 76/28* (2018.01)

(52) U.S. Cl.
CPC .................................. *H04W 76/28* (2018.02)

(58) Field of Classification Search
CPC ............. H04W 76/28; H04W 52/0216; H04W 52/0225; H04W 76/14; H04W 92/10; H04W 92/18
See application file for complete search history.

(56) References Cited

U.S. PATENT DOCUMENTS

| | | | |
|---|---|---|---|
| 2021/0227621 A1* | 7/2021 | Pan | H04W 76/27 |
| 2022/0232665 A1* | 7/2022 | Back | H04W 76/28 |
| 2022/0312543 A1* | 9/2022 | Wu | H04W 76/28 |
| 2022/0418036 A1* | 12/2022 | Back | H04W 76/28 |
| 2023/0050074 A1* | 2/2023 | Yu | H04W 76/28 |
| 2023/0064488 A1* | 3/2023 | Han | H04W 76/28 |
| 2023/0097552 A1* | 3/2023 | Freda | H04L 1/1848 |
| | | | 370/329 |

(Continued)

FOREIGN PATENT DOCUMENTS

WO    2021147011 A1    7/2021

OTHER PUBLICATIONS

3GPP TSG-RAN WG2 Meeting #113bis electronic; R2-2103470 (as submitted in IDS (identified as D1), the same assignee corresponding to primary reference); Source: Lenovo, Motorola Mobility, Title: Coordination between Uu DRX and SL DRX; E-meeting, Apr. 12-20, 2021 (Year: 2021).*

(Continued)

*Primary Examiner* — Mohammed S Chowdhury
(74) *Attorney, Agent, or Firm* — Procopio, Cory, Hargreaves & Savitch

(57) ABSTRACT

Aspects present herein relate to methods and devices for wireless communication including an apparatus, e.g., a UE and/or a base station. The apparatus may receive a first indication of assistance information associated with a Uu DRX configuration and an SL DRX configuration. The apparatus may also transmit a second indication of the assistance information associated with the Uu DRX configuration and the SL DRX configuration. Additionally, the apparatus may receive an indication of the Uu DRX configuration and an indication of the SL DRX configuration.

29 Claims, 17 Drawing Sheets

(56) References Cited

U.S. PATENT DOCUMENTS

2023/0199909 A1* 6/2023 Mohammad .......... H04W 24/02 370/329

OTHER PUBLICATIONS

3GPP TSG-RAN WG2 Meeting #113 bis electronic; R2-2103577; Source: MediaTek Inc .; Title: On coordination between Uu DRX and SL DRX ; Online, Apr. 12-Apr. 20, 2021. (Year: 2021).*
3GPP TSG-RAN WG2 Meeting #114-e; R2-2105083; Source: Huawei, HiSilicon ; Title: Consideration on the sidelink DRX for unicast; Online, May 19-May 27, 2021 (Year: 2021).*
3GPP TSG RAN WG2 Meeting #115-e ; R2-2107312; Source: Intel Corporation; Title: On DRX wake-up time alignment; Electronic meeting, Online, Aug. 2021. (Year: 2021).*
Ericsson: "DRX Alignment Between Uu and SL", 3GPP TSG-RAN WG2 Meeting #113-e, R2-2100538, 3rd Generation Partnership Project (3GPP), Mobile Competence Centre, 650, Route Des Lucioles, F-06921 Sophia-Antipolis Cedex, France, vol. RAN WG2, No. e-Meeting, Jan. 25, 2021-Feb. 5, 2021, Jan. 14, 2021, 3 Pages, XP051972688, The Whole Document.
Ericsson: "Summary of [706]", 3GPP TSG-RAN WG2 #114e, R2-2105495, 3rd Generation Partnership Project (3GPP), Mobile Competence Centre, 650, Route Des Lucioles, F-06921 Sophia-Antipolis Cedex, France, vol. RAN WG2, No. Electronic Meeting, May 19, 2021, May 10, 2021, 15 Pages, XP052003872, Items [2.2], [2.4], [2.5].
Fraunhofer IIS, et al., "NR SL DRX", 3GPP TSG RAN WG2 Meeting #113bis-e, R2-2103011, 3rd Generation Partnership Project (3GPP), Mobile Competence Centre, 650, Route Des Lucioles, F-06921 Sophia-Antipolis Cedex, France, vol. RAN WG2, No. Online, Apr. 12, 2021-Apr. 20, 2021, Apr. 1, 2021, 6 Pages, XP051991995, The Whole Document.
Huawei, et al., "Alignment Between Uu DRX and SL DRX", 3GPP TSG-RAN WG2 Meeting #113 electronic, R2-2101764, 3rd Generation Partnership Project (3GPP), Mobile Competence Centre, 650, Route Des Lucioles, F-06921 Sophia-Antipolis Cedex, France, vol. RAN WG2, No. electronic, Jan. 25, 2020-Feb. 5, 2020, Jan. 15, 2021, 6 Pages, XP051974629, The Whole Document.
Huawei, et al., "Discussion on SL Communication Impact on Uu DRX", 3GPP TSG RAN WG2 Meeting #113b-e, R2-2104113, 3rd Generation Partnership Project (3GPP), Mobile Competence Centre, 650, Route Des Lucioles, F-06921 Sophia-Antipolis Cedex, France, vol. RAN WG2, No. Electronic Meeting, Apr. 12, 2021-Apr. 20, 2021, Apr. 2, 2021, 8 Pages, XP052175377, Item [2].
Huawei, et al., "Discussion on SL Communication impact on Uu DRX", 3GPP TSG RAN WG2 Meeting #114-e, R2-2105593, 3rd Generation Partnership Project (3GPP), Mobile Competence Centre, 650, Route Des Lucioles, F-06921 Sophia-Antipolis Cedex, France, vol. RAN WG2, No. Electronic Meeting, May 19, 2021-May 27, 2021, May 11, 2021, 7 Pages, XP052007169, The Whole Document.
Huawei, et al., "Summary of [POST114-e] [705] [V2X/SL] Discussion on Remaining FFSs and Open Issues in Uu DRX Timer Impacts (Huawei, HiSilicon)", 3GPP TSG-RAN WG2 Meeting #115-e, R2-2107159, 3rd Generation Partnership Project (3GPP), Mobile Competence Centre, 650, Route Des Lucioles, F-06921 Sophia-Antipolis Cedex, France, vol. RAN WG2, No. Electronic, Aug. 9, 2021-Aug. 27, 2021, Aug. 6, 2021, 39 Pages, XP052033922, p. 2, 4.
International Search Report and Written Opinion—PCT/US2022/045255—ISA/EPO—dated Jan. 23, 2023.
Lenovo, et al., "Coordination Between Uu DRX and SL DRX", 3GPP TSG-RAN WG2 Meeting #113bis electronic, R2-2103470, 3GPP TSG RAN WG1 Meeting #106-e, R1-2108244, 3rd Generation Partnership Project (3GPP), Mobile Competence Centre, 650, Route Des Lucioles, F-06921 Sophia-Antipolis Cedex, France, vol. RAN WG2, No. electronic, Apr. 12, 2021-Apr. 20, 2021, Apr. 1, 2021, 5 Pages, XP051992098, The Whole Document.
Lenovo, et al., "Coordination between Uu DRX and SL DRX", 3GPP TSG-RAN WG2 Meeting #115 electronic, R2-2108016, 3rd Generation Partnership Project (3GPP), Mobile Competence Centre, 650, Route Des Lucioles, F-06921 Sophia-Antipolis Cedex, France, vol. RAN WG2, No. electronic, Aug. 9, 2021-Aug. 27, 2021, Aug. 5, 2021, 6 Pages, XP052032408, The Whole Document.
Mediatek Inc: "On Coordination Between Uu DRX and SL DRX", 3GPP TSG-RAN WG2 Meeting #113 bis Electronic Online, R2-2103577, 3rd Generation Partnership Project (3GPP), Mobile Competence Centre, 650, Route Des Lucioles, F-06921 Sophia-Antipolis Cedex, France, vol. RAN WG2, No. electronic, Apr. 12, 2021-Apr. 20, 2021, Apr. 2, 2021, 2 Pages, XP052175047, The Whole Document.
OPPO: "Discussion on DRX Configuration", 3GPP TSG-RAN WG2 #113bis-e, R2-2102886, 3rd Generation Partnership Project (3GPP), Mobile Competence Centre, 650, Route Des Lucioles, F-06921 Sophia-Antipolis Cedex, France, vol. RAN WG2, No. E-meeting, Apr. 1, 2021, Apr. 2, 2021, 8 Pages, XP052174459, The Whole Document.
OPPO: "Discussion on DRX Configuration and DRX Timers", 3GPP TSG-RAN WG2 #114-e, R2-2104835, 3rd Generation Partnership Project (3GPP), Mobile Competence Centre, 650, Route Des Lucioles, F-06921 Sophia-Antipolis Cedex, France, vol. RAN WG2, No. E-meeting, May 1, 2021, May 11, 2021, 17 Pages, XP052006585, Item [2].
OPPO: "Discussion on Network Involvement for SL Related DRX", 3GPP TSG-RAN WG2 #113-e, R2-2100275, 3rd Generation Partnership Project (3GPP), Mobile Competence Centre, 650, Route Des Lucioles, F-06921 Sophia-Antipolis Cedex, France, vol. RAN WG2, No. E-meeting, Jan. 1, 2021, Jan. 15, 2021, 4 Pages, XP051973475, The Whole Document.

* cited by examiner

FIG. 10A

| drx-Slot-Offset | drx-Short-Cycle | Oct1 |
|---|---|---|
| | | Oct2 |
| drx-LongCycleStartOffset | | Oct3 |

| drx-Slot-Offset1 | drx-Short-Cycle1 | Oct1 |
|---|---|---|
| drx-Short-Cycle1 | drx-LongCycleStartOffset1 | Oct2 |
| drx-LongCycleStartOffset1 | | Oct3 |
| drx-Slot-Offset2 | drx-Short-Cycle2 | Oct4 |
| drx-Short-Cycle2 | drx-LongCycleStartOffset2 | Oct5 |
| drx-LongCycleStartOffset2 | | Oct6 |

| sl-drx-Slot-Offset1 | sl-drx-StartOffset1 | Oct1 |
|---|---|---|
| sl-drx-StartOffset1 | | Oct2 |
| sl-drx-Cycle1 | | Oct3 |
| sl-drx-Slot-Offset2 | sl-drx-StartOffset2 | Oct4 |
| sl-drx-StartOffset2 | | Oct5 |
| sl-drx-Cycle2 | | Oct6 |

| sl-drx-Slot-Offset | sl-drx-StartOffset | Oct1 |
|---|---|---|
| sl-drx-StartOffset | | Oct2 |
| sl-drx-Cycle | | Oct3 |

1060

SIGNALING OF JOINT ALIGNMENT OF UU DRX AND SL DRX

TECHNICAL FIELD

The present disclosure relates generally to communication systems, and more particularly, to discontinuous reception (DRX) configurations in wireless communications.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

BRIEF SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. The apparatus may be a user equipment (UE). The apparatus may receive a first indication of assistance information associated with a UE-universal mobile telecommunications system terrestrial radio access network (UTRAN) (Uu) discontinuous reception (DRX) configuration and a sidelink (SL) DRX configuration. The apparatus may also transmit a second indication of the assistance information associated with the Uu DRX configuration and the SL DRX configuration. Additionally, the apparatus may receive an indication of the Uu DRX configuration and an indication of the SL DRX configuration.

In another aspect of the disclosure, a method, a computer-readable medium, and an apparatus are provided. The apparatus may be a base station. The apparatus may receive, from a user equipment (UE), an indication of assistance information associated with a UE-universal mobile telecommunications system terrestrial radio access network (UTRAN) (Uu) discontinuous reception (DRX) configuration and a sidelink (SL) DRX configuration. The apparatus may also configure the SL DRX configuration and the Uu DRX configuration based on the indication of the assistance information. Further, the apparatus may transmit, to the UE, an indication of the SL DRX configuration and an indication of the Uu DRX configuration.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIG. 10A is a diagram illustrating an example medium access control (MAC) control element (MAC-CE) format.

FIG. 10B is a diagram illustrating an example MAC-CE format.

FIG. 10C is a diagram illustrating an example MAC-CE format.

FIG. 10D is a diagram illustrating an example MAC-CE format.

DETAILED DESCRIPTION

Figure 1:
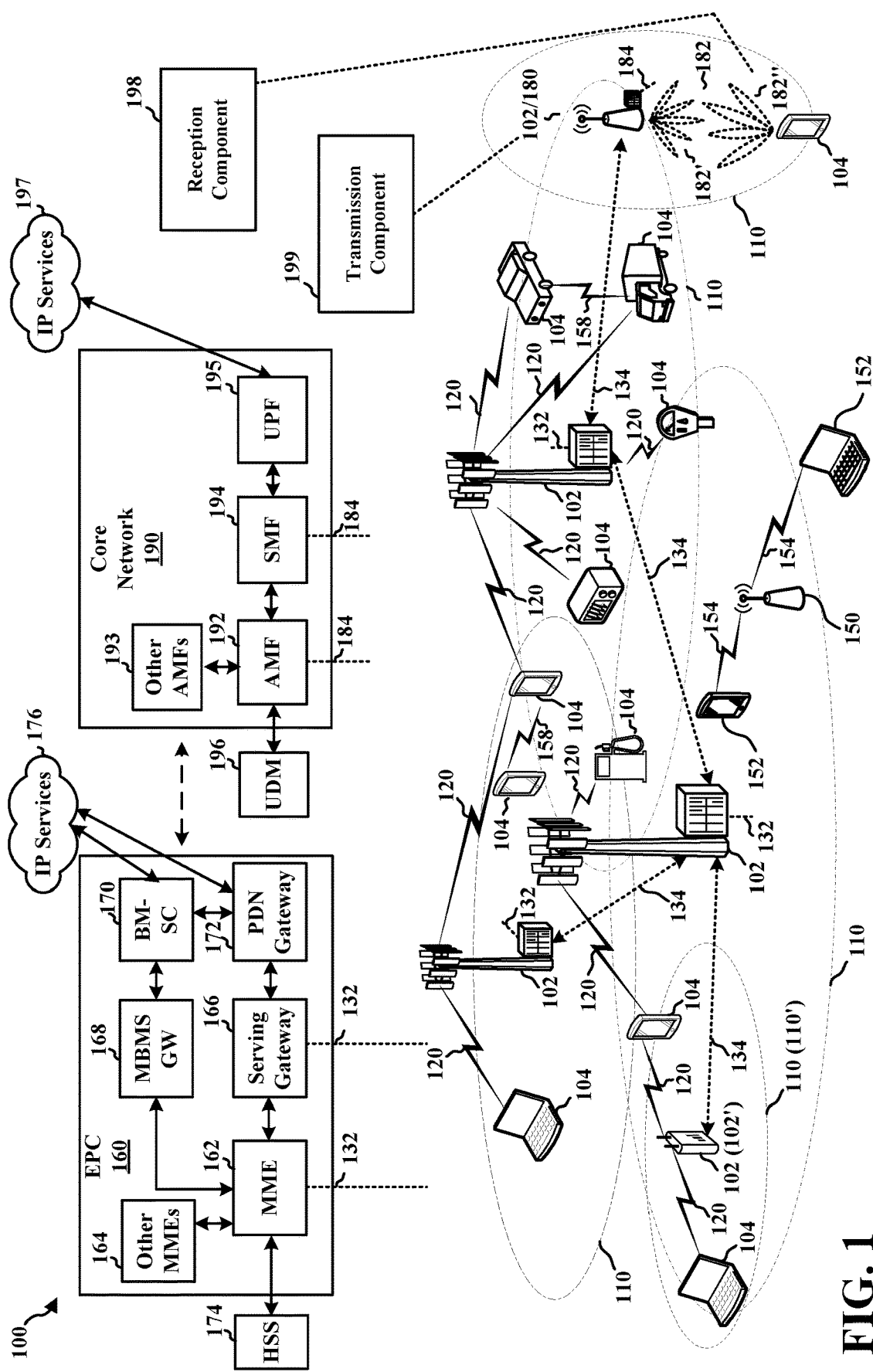
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the types of computer-readable media, or any other medium that can be used to store computer executable code in the form of instructions or data structures that can be accessed by a computer.

While aspects and implementations are described in this application by illustration to some examples, those skilled in the art will understand that additional implementations and use cases may come about in many different arrangements and scenarios. Innovations described herein may be implemented across many differing platform types, devices, systems, shapes, sizes, and packaging arrangements. For example, implementations and/or uses may come about via integrated chip implementations and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described innovations may occur. Implementations may range a spectrum from chip-level or modular components to non-modular, non-chip-level implementations and further to aggregate, distributed, or original equipment manufacturer (OEM) devices or systems incorporating one or more aspects of the described innovations. In some practical settings, devices incorporating described aspects and features may also include additional components and features for implementation and practice of claimed and described aspect. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). It is intended that innovations described herein may be practiced in a wide variety of devices, chip-level components, systems, distributed arrangements, aggregated or disaggregated components, end-user devices, etc. of varying sizes, shapes, and constitution.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., S1 interface). The base stations 102 configured for 5G NR (collectively referred to as Next Generation RAN (NG-RAN)) may interface with core network 190 through second backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over third backhaul links 134 (e.g., X2 interface). The first backhaul links 132, the second backhaul links 184, and the third backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, WiMedia, Bluetooth, ZigBee, Wi-Fi based on the Institute of Electrical and Electronics Engineers (IEEE) 802.11 standard, LTE, or NR.

The wireless communications system may further include a Wi-Fi access point (AP) 150 in communication with Wi-Fi stations (STAs) 152 via communication links 154, e.g., in a 5 GHz unlicensed frequency spectrum or the like. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same unlicensed frequency spectrum (e.g., 5 GHz, or the like) as used by the Wi-Fi AP 150. The small cell 102', employing NR in an unlicensed frequency spectrum, may boost coverage to and/or increase capacity of the access network.

The electromagnetic spectrum is often subdivided, based on frequency/wavelength, into various classes, bands, channels, etc. In 5G NR, two initial operating bands have been identified as frequency range designations FR1 (410 MHz-7.125 GHz) and FR2 (24.25 GHz-52.6 GHz). Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, FR4, FR4-a or FR4-1, and/or FR5, or may be within the EHF band.

A base station 102, whether a small cell 102' or a large cell (e.g., macro base station), may include and/or be referred to as an eNB, gNodeB (gNB), or another type of base station. Some base stations, such as gNB 180 may operate in a traditional sub 6 GHz spectrum, in millimeter wave frequencies, and/or near millimeter wave frequencies in communication with the UE 104. When the gNB 180 operates in millimeter wave or near millimeter wave frequencies, the gNB 180 may be referred to as a millimeter wave base station. The millimeter wave base station 180 may utilize beamforming 182 with the UE 104 to compensate for the path loss and short range. The base station 180 and the UE 104 may each include a plurality of antennas, such as antenna elements, antenna panels, and/or antenna arrays to facilitate the beamforming.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include an Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a Packet Switch (PS) Streaming (PSS) Service, and/or other IP services.

The base station may include and/or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. In some scenarios, the term UE may also apply to one or more companion devices such as in a device constellation arrangement. One or more of these devices may collectively access the network and/or individually access the network.

Referring again to FIG. 1, in certain aspects, the UE 104 may include a reception component 198 configured to receive a first indication of assistance information associated with a UE-universal mobile telecommunications system terrestrial radio access network (UTRAN) (Uu) discontinuous reception (DRX) configuration and a sidelink (SL) DRX configuration. Reception component 198 may also be configured to transmit a second indication of the assistance information associated with the Uu DRX configuration and the SL DRX configuration. Reception component 198 may also be configured to receive an indication of the Uu DRX configuration and an indication of the SL DRX configuration.

Referring again to FIG. 1, in certain aspects, the base station 180 may include a transmission component 199 configured to receive, from a user equipment (UE), an indication of assistance information associated with a UE-universal mobile telecommunications system terrestrial radio access network (UTRAN) (Uu) discontinuous reception (DRX) configuration and a sidelink (SL) DRX configuration. Transmission component 199 may also be configured to configure the SL DRX configuration and the Uu DRX configuration based on the indication of the assistance information. Transmission component 199 may also be configured to transmit, to the UE, an indication of the SL DRX configuration and an indication of the Uu DRX configuration.

Although the following description may be focused on 5G NR, the concepts described herein may be applicable to other similar areas, such as LTE, LTE-A, CDMA, GSM, and other wireless technologies.

Figure 2:
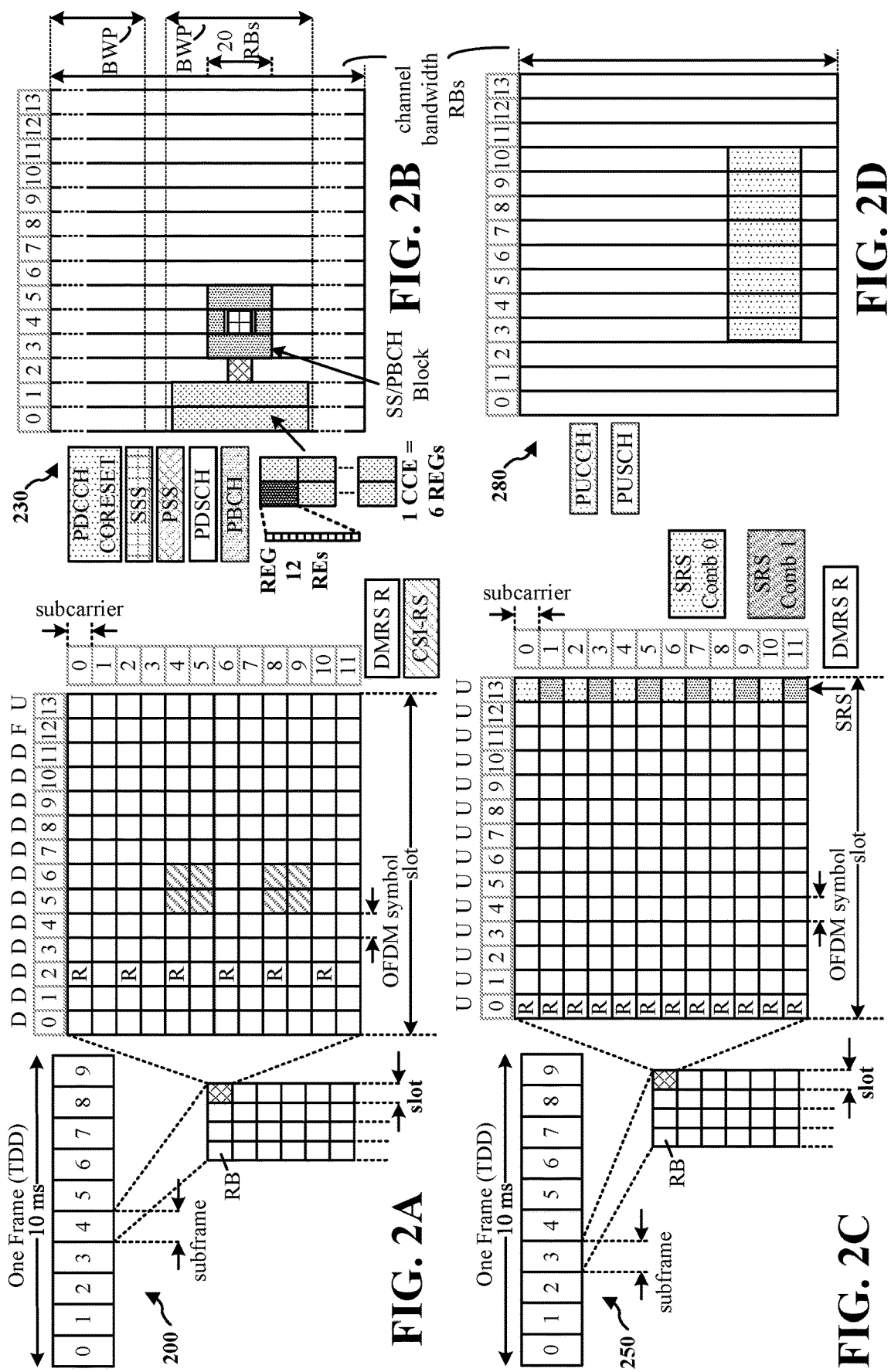
FIG. 2A is a diagram illustrating an example of a first frame, in accordance with various aspects of the present disclosure.
FIG. 2B is a diagram illustrating an example of DL channels within a subframe, in accordance with various aspects of the present disclosure.
FIG. 2C is a diagram illustrating an example of a second frame, in accordance with various aspects of the present disclosure.
FIG. 2D is a diagram illustrating an example of UL channels within a subframe, in accordance with various aspects of the present disclosure.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 1 (with all UL). While subframes 3, 4 are shown with slot formats 1, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

FIGS. 2A-2D illustrate a frame structure, and the aspects of the present disclosure may be applicable to other wireless communication technologies, which may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 14 or 12 symbols, depending on whether the cyclic prefix (CP) is normal or extended. For normal CP, each slot may include 14 symbols, and for extended CP, each slot may include 12 symbols. The symbols on DL may be CP orthogonal frequency division multiplexing (OFDM) (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the CP and the numerology. The numerology defines the subcarrier spacing (SCS) and, effectively, the symbol length/duration, which is equal to 1/SCS.

| $\mu$ | SCS $\Delta f = 2^\mu \cdot 15 [kHz]$ | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |

For normal CP (14 symbols/slot), different numerologies $\mu 0$ to 4 allow for 1, 2, 4, 8, and 16 slots, respectively, per subframe. For extended CP, the numerology 2 allows for 4 slots per subframe. Accordingly, for normal CP and numerology $\mu$, there are 14 symbols/slot and $2^\mu$ slots/subframe. The subcarrier spacing may be equal to $2^\mu *15$ kHz, where $\mu$ is the numerology 0 to 4. As such, the numerology $\mu=0$ has a subcarrier spacing of 15 kHz and the numerology $\mu=4$ has a subcarrier spacing of 240 kHz. The symbol length/duration is inversely related to the subcarrier spacing. FIGS. 2A-2D provide an example of normal CP with 14 symbols per slot and numerology $\mu=2$ with 4 slots per subframe. The slot duration is 0.25 ms, the subcarrier spacing is 60 kHz, and the symbol duration is approximately 16.67 μs. Within a set of frames, there may be one or more different bandwidth parts (BWPs) (see FIG. 2B) that are frequency division multiplexed. Each BWP may have a particular numerology and CP (normal or extended).

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as R for one particular configuration, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs) (e.g., 1, 2, 4, 8, or 16 CCEs), each CCE including six RE groups (REGs), each REG including 12 consecutive REs in an OFDM symbol of an RB. A PDCCH within one BWP may be referred to as a control resource set (CORESET). A UE is configured to monitor PDCCH candidates in a PDCCH search space (e.g., common search space, UE-specific search space) during PDCCH monitoring occasions on the CORESET, where the PDCCH candidates have different DCI formats and different aggregation levels. Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARQ) acknowledgment (ACK) (HARQ-ACK) feedback (i.e., one or more HARQ ACK bits indicating one or more ACK and/or negative ACK (NACK)). The PUSCH carries data, and may additionally be used to carry a buffer status report (BSR), a power headroom report (PHR), and/or UCI.

Figure 3:
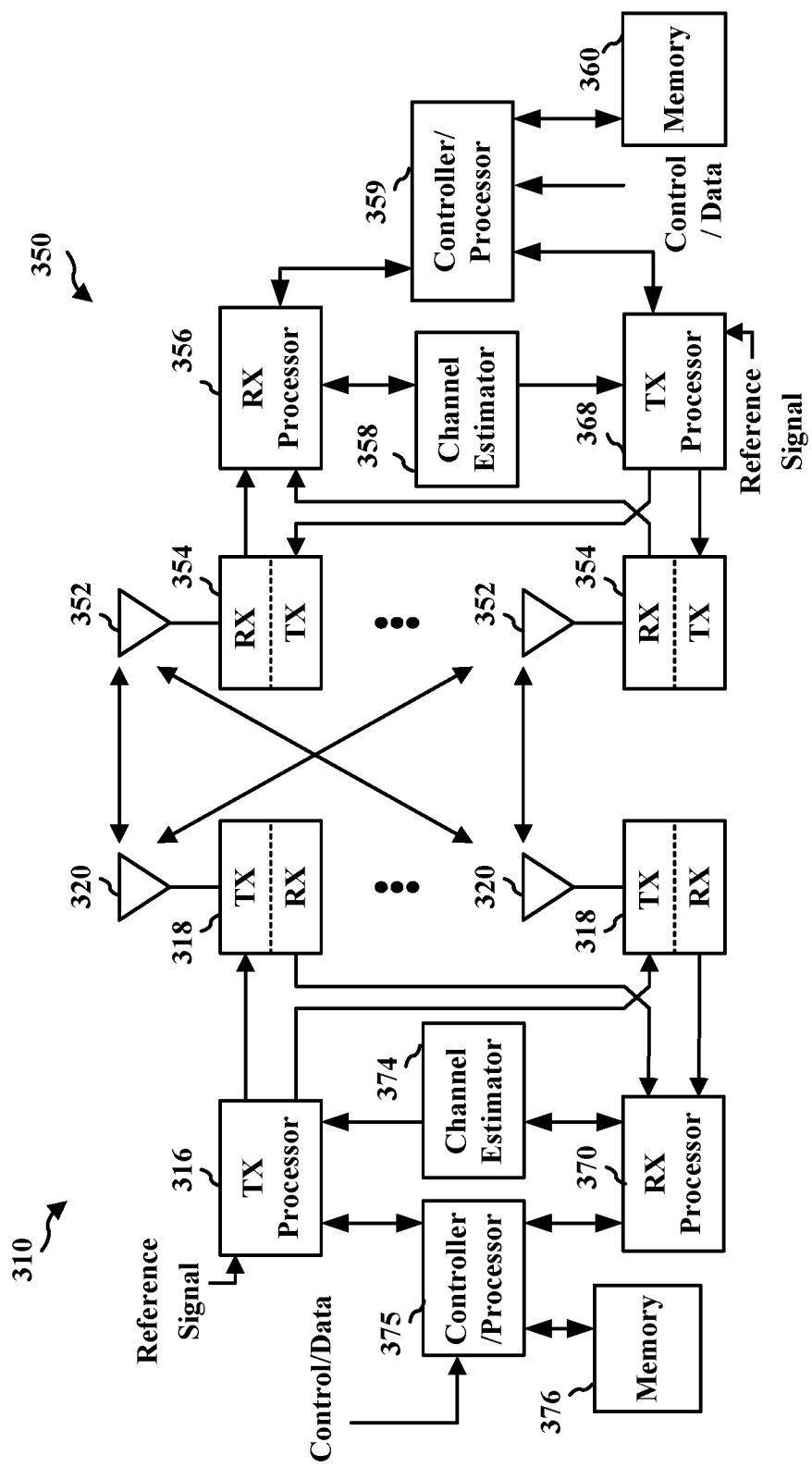
FIG. 3 is a diagram illustrating an example of a base station and user equipment (UE) in an access network.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318 TX. Each transmitter 318 TX may modulate a radio frequency (RF) carrier with a respective spatial stream for transmission.

At the UE 350, each receiver 354 RX receives a signal through its respective antenna 352. Each receiver 354 RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

At least one of the TX processor 368, the RX processor 356, and the controller/processor 359 may be configured to perform aspects in connection with 198 of FIG. 1.

At least one of the TX processor 316, the RX processor 370, and the controller/processor 375 may be configured to perform aspects in connection with 199 of FIG. 1.

Figure 4:
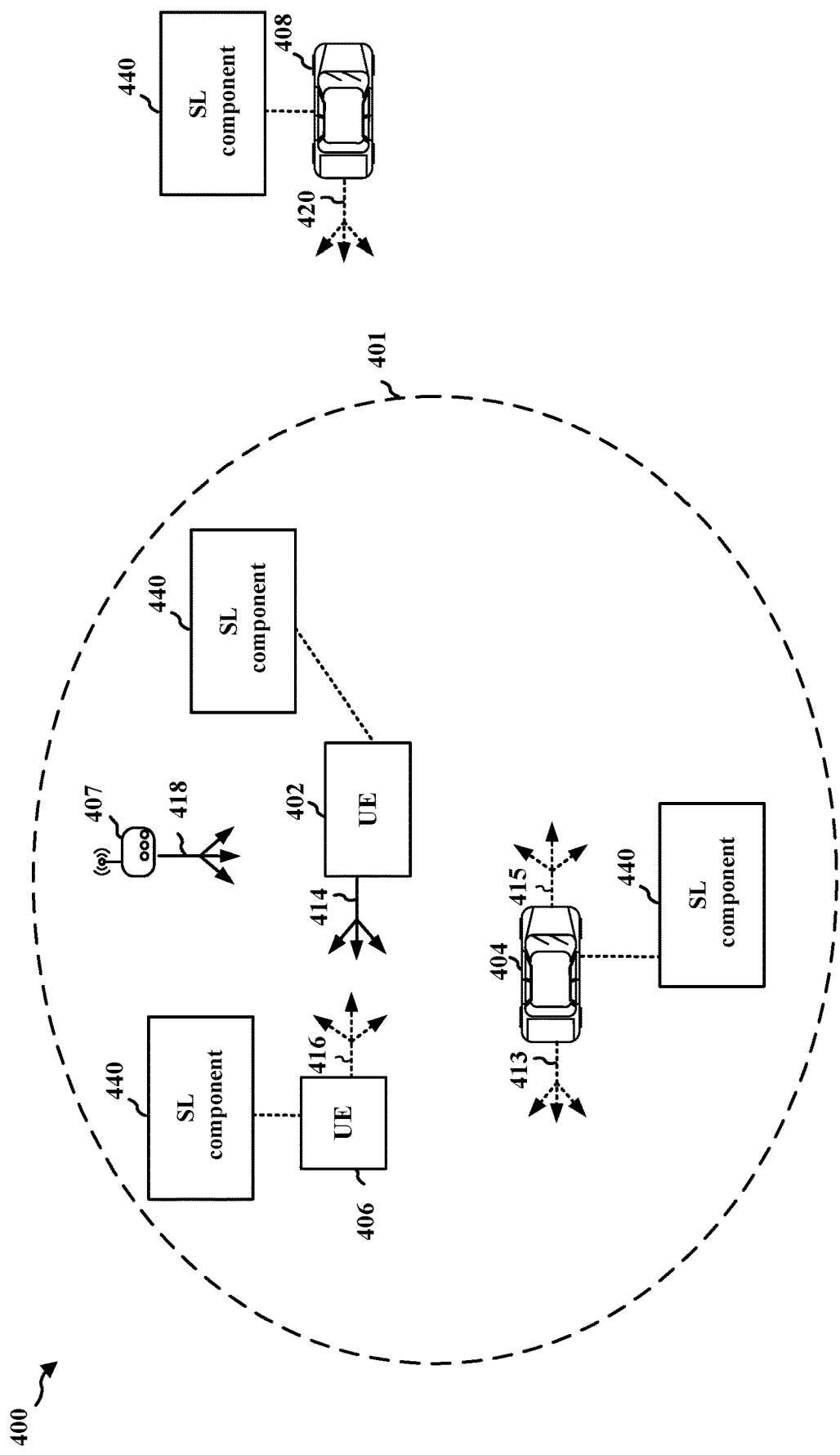
FIG. 4 is a diagram illustrating example aspects of sidelink communication between devices.

FIG. 4 is a diagram 400 illustrating example aspects of sidelink communication between devices. For example, the UE 402 may transmit a sidelink transmission 414, e.g., including a control channel (e.g., a physical sidelink control channel (PSCCH)) and/or a corresponding data channel (e.g., a physical sidelink shared channel (PSSCH)), that may be received by UEs 404, 406, 408. A control channel may include information (e.g., sidelink control information (SCI)) for decoding the data channel including reservation information, such as information about time and/or frequency resources that are reserved for the data channel transmission. For example, the SCI may indicate a number of TTIs, as well as the RBs that will be occupied by the data transmission. The SCI may also be used by receiving devices to avoid interference by refraining from transmitting on the reserved resources. The UEs 402, 404, 406, 408 may each be capable of sidelink transmission in addition to sidelink reception. Thus, UEs 404, 406, 408 are illustrated as transmitting sidelink transmissions 413, 415, 416, 420. The sidelink transmissions 413, 414, 415, 416, 420 may be unicast, broadcast, or multicast to nearby devices. For example, UE 404 may transmit transmissions 413, 415 intended for receipt by other UEs within a range 401 of UE 404, and UE 406 may transmit transmission 416. Additionally, RSU 407 may receive communication from and/or transmit transmission 418 to UEs 402, 404, 406, 408. One or more of the UEs 402, 404, 406, 408 or the RSU 407 may include an SL component 440.

Sidelink communication may be based on different types or modes of resource allocation mechanisms. In a first resource allocation mode (which may be referred to herein as "Mode 1"), centralized resource allocation may be provided by a network entity. For example, a base station may determine resources for sidelink communication and may allocate resources to different UEs to use for sidelink transmissions. In this first mode, a UE receives the allocation of sidelink resources from the base station. In a second resource allocation mode (which may be referred to herein as "Mode 2"), distributed resource allocation may be provided. In Mode 2, each UE may autonomously determine resources to use for sidelink transmission. In order to coordinate the selection of sidelink resources by individual UEs, each UE may use a sensing technique to monitor for resource reservations by other sidelink UEs and may select resources for sidelink transmissions from unreserved resources. Devices communicating based on sidelink may determine one or more radio resources in the time and frequency domain that are used by other devices in order to select transmission resources that avoid collisions with other devices. The sidelink transmission and/or the resource reservation may be periodic or aperiodic, where a UE may reserve resources for transmission in a current slot and up to two future slots (as discussed below). Thus, in the second mode (e.g., Mode 2), individual UEs may autonomously select resources for sidelink transmission, e.g., without a central entity such as a base station indicating the resources for the device. A first UE may reserve the selected resources in order to inform other UEs about the resources that the first UE intends to use for sidelink transmission(s).

In some examples, the resource selection for sidelink communication may be based on a sensing-based mechanism. For instance, before selecting a resource for a data transmission, a UE may first determine whether resources have been reserved by other UEs. For example, as part of a sensing mechanism for resource allocation mode 2, the UE may determine (e.g., sense) whether the selected sidelink resource has been reserved by other UE(s) before selecting a sidelink resource for a data transmission. If the UE determines that the sidelink resource has not been reserved by other UEs, the UE may use the selected sidelink resource for transmitting the data, e.g., in a PSSCH transmission. The UE may estimate or determine which radio resources (e.g., sidelink resources) may be in-use and/or reserved by others by detecting and decoding sidelink control information (SCI) transmitted by other UEs. The UE may use a sensing-based resource selection algorithm to estimate or determine which radio resources are in-use and/or reserved by others. The UE may receive SCI from another UE that includes reservation information based on a resource reservation field included in the SCI. The UE may continuously monitor for (e.g., sense) and decode SCI from peer UEs. The SCI may include reservation information, e.g., indicating slots and RBs that a particular UE has selected for a future transmission. The UE may exclude resources that are used and/or reserved by other UEs from a set of candidate resources for sidelink transmission by the UE, and the UE may select/reserve resources for a sidelink transmission from the resources that are unused and therefore form the set of candidate resources. The UE may continuously perform sensing for SCI with resource reservations in order to maintain a set of candidate resources from which the UE may select one or more resources for a sidelink transmission. Once the UE selects a candidate resource, the UE may transmit SCI indicating its own reservation of the resource for a sidelink transmission. The number of resources (e.g., sub-channels per subframe) reserved by the UE may depend on the size of data to be transmitted by the UE. Although the example is described for a UE receiving reservations from another UE, the reservations may also be received from an RSU or other device communicating based on sidelink.

Figure 5:
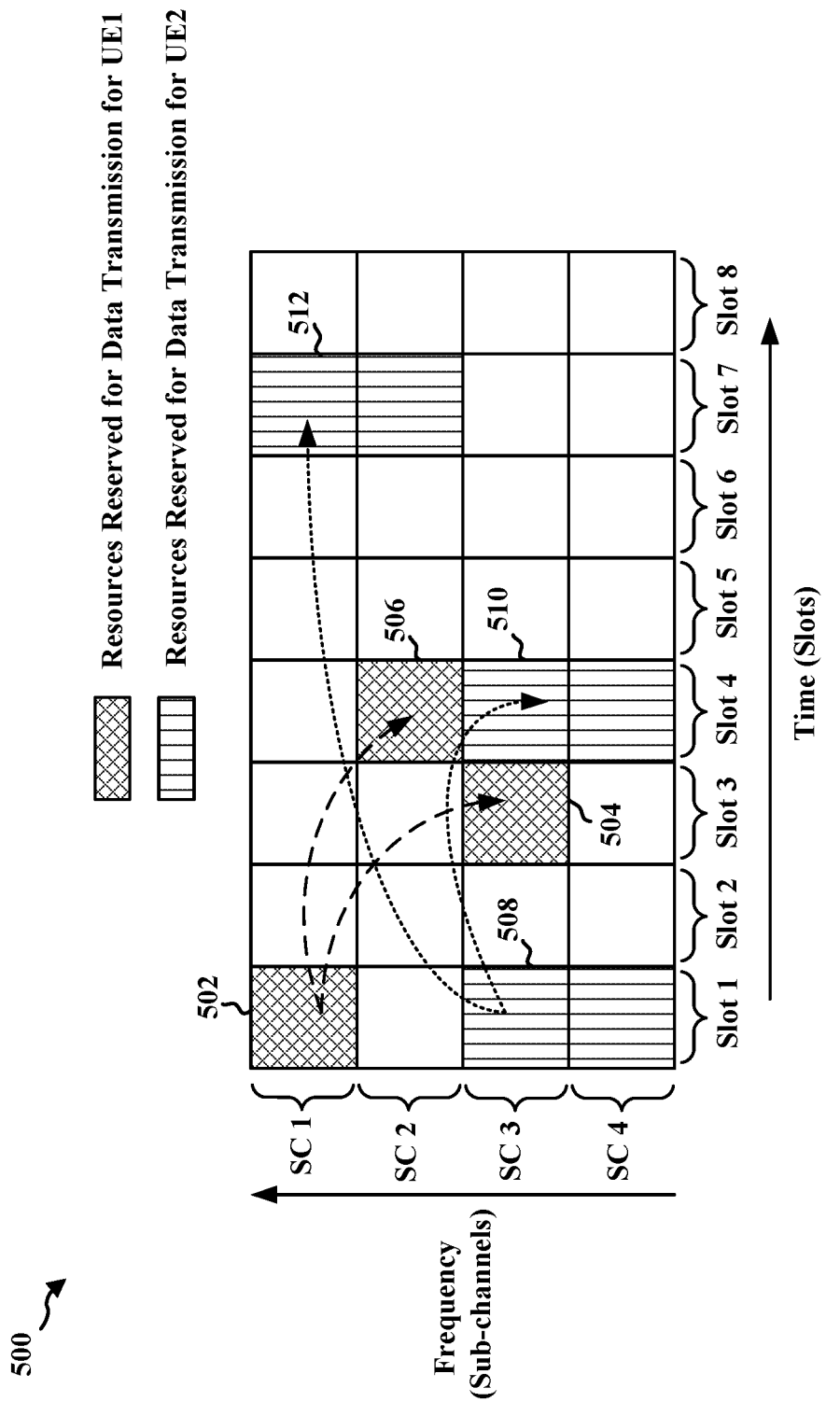
FIG. 5 is a diagram illustrating examples of resource reservation for sidelink communication.

FIG. 5 is diagram 500 illustrating an example of time and frequency resources showing reservations for sidelink transmissions. The resources may be included in a sidelink resource pool, for example. The resource allocation for each UE may be in units of one or more sub-channels in the frequency domain (e.g., sub-channels SC 1 to SC 4), and may be based on one slot in the time domain. The UE may also use resources in the current slot to perform an initial transmission, and may reserve resources in future slots for retransmissions. In this example, two different future slots are being reserved by UE1 and UE2 for retransmissions. The resource reservation may be limited to a window of predefined slots and sub-channels, such as a window including 8 time slots by 4 sub-channels, as shown in diagram 500, which provides 32 available resource blocks in total. This window may also be referred to as a resource selection window.

A first UE (UE1) may reserve a sub-channel (e.g., SC 1) in a current slot (e.g., slot 1) for its initial data transmission 502, and may reserve additional future slots within the window for data retransmissions (e.g., 504 and 506). For example, UE1 may reserve sub-channels SC 3 at slot 3 and SC 2 at slot 4 for future retransmissions as shown by FIG. 4. UE1 may then transmit information regarding which resources are being used and/or reserved by it to other UE(s). UE1 may do so by including the reservation information in the reservation resource field of the SCI, e.g., a first stage SCI.

FIG. 5 illustrates that a second UE (UE2) reserves resources in sub-channels SC 3 and SC 4 at time slot 1 for its current data transmission 508, and reserve first data retransmission 510 at time slot 4 using sub-channels SC 3 and SC 4, and reserve second data retransmission 512 at time slot 7 using sub-channels SC 1 and SC 2 as shown by FIG. 5. Similarly, UE2 may transmit the resource usage and reservation information to other UE(s), such as using the reservation resource field in SCI.

A third UE may consider resources reserved by other UEs within the resource selection window to select resources to transmit its data. The third UE may first decode SCIS within a time period to identify which resources are available (e.g., candidate resources). For example, the third UE may exclude the resources reserved by UE1 and UE2 and may select other available sub-channels and time slots from the candidate resources for its transmission and retransmissions, which may be based on a number of adjacent sub-channels in which the data (e.g., packet) to be transmitted can fit. While FIG. 5 illustrates resources being reserved for an initial transmission and two retransmissions, the reservation may be for an initial transmission and a single transmission or for an initial transmission.

The UE may determine an associated signal measurement (such as RSRP) for each resource reservation received by another UE. The UE may consider resources reserved in a transmission for which the UE measures an RSRP below a threshold to be available for use by the UE. A UE may perform a signal/channel measurement for a sidelink resource that has been reserved and/or used by other UE(s), such as by measuring the RSRP of the message (e.g., the SCI) that reserves the sidelink resource. Based at least in part on the signal/channel measurement, the UE may consider using/reusing the sidelink resource that has been reserved by other UE(s). For example, the UE may exclude the reserved resources from a candidate resource set if the measured RSRP meets or exceeds the threshold, and the UE may consider a reserved resource to be available if the measured RSRP for the message reserving the resource is below the threshold. The UE may include the resources in the candidate resources set and may use/reuse such reserved resources when the message reserving the resources has an RSRP below the threshold, because the low RSRP indicates that the other UE is distant and a reuse of the resources is less likely to cause interference to that UE. A higher RSRP indicates that the transmitting UE that reserved the resources is potentially closer to the UE and may experience higher levels of interference if the UE selected the same resources.

For example, in a first step, the UE may determine a set of candidate resources (e.g., by monitoring SCI from other UEs and removing resources from the set of candidate resources that are reserved by other UEs in a signal for which the UE measures an RSRP above a threshold value). In a second step, the UE may select N resources for transmissions and/or retransmissions of a TB. As an example, the UE may randomly select the N resources from the set of candidate resources determined in the first step. In a third step, for each transmission, the UE may reserve future time and frequency resources for an initial transmission and up to two retransmissions. The UE may reserve the resources by transmitting SCI indicating the resource reservation. For example, in the example in FIG. 5, the UE may transmit SCI reserving resources for data transmission 508 and data retransmissions 510 and 512.

In some aspects of wireless communications, e.g., 5G new radio (NR), a UE may be configured by a base station for a discontinuous reception (DRX) mode. In some instances, when there is no data to be transmitted between the UE and base station in either direction (e.g., no uplink or downlink transmissions) the UE may enter the DRX mode in which the UE may monitor a control channel discontinuously using a sleep and awake cycle. Moreover, the DRX mode may conserve battery power at the UE. Without DRX, the UE may need to monitor the control channel in each subframe in order to determine whether there is data for the UE. Continuous monitoring of the control channel may place a demand on the UE's battery power.

A UE and a base station may communicate during a reception cycle. In some aspects, this may occur when the UE is configured by the base station for a DRX mode. Accordingly, the reception cycle may be a DRX cycle. In some aspects, a DRX cycle may be a reception cycle during which the UE and a base station communicate while the UE is in a DRX mode. Also, the UE may receive a configuration for the reception cycle from the base station. During the DRX cycle between the base station and the UE, the base station may send a wake-up signal (WUS) monitoring occasion (MO).

In some instances, the base station may send a WUS to the UE when the base station will transmit communication to the UE. Accordingly, the base station may send a WUS to the UE during the reception cycle. In some aspects, during the reception cycle, the UE may determine whether to monitor for a WUS during a WUS time resource. If the UE receives a WUS, the UE may wake-up by preparing to receive the communication. If the UE does not receive a WUS, the UE may return to sleep mode.

In some modes of operation, a UE may be constantly awake and monitor for a PDCCH in each subframe. This means that the UE may be awake all of the time since the UE may not know exactly when the network will transmit data. By monitoring the PDCCH, the UE may monitor instructions from the network or base station. However, this PDCCH monitoring may consume a lot of power on the UE side. As mentioned above, DRX is a mechanism in which a UE transitions to sleep mode for a certain period of time and wakes-up for another period of time. One purpose of DRX may be to save power at the UE, such as by monitoring for a wake-up signal (WUS), which may reduce the amount of power utilized by the UE. So the DRX cycle may help to reduce power utilized at the UE by not continuously monitoring for the PDCCH. During a DRX cycle there may be multiple UE settings, such as an 'ON' time, i.e., where the UE monitors for the PDCCH, and an 'OFF' time, i.e., where the UE is not monitoring for the PDCCH and saving power.

There are a number of different parameters associated with DRX. As indicated above, the DRX cycle is the duration of one ON time and one OFF time. In some instances, the DRX cycle may be calculated by the subframe time and a longdrx-CycleStartOffset parameter. Also, the DRX cycle may not be explicitly specified in RRC messages. The onDurationTimer may be the duration of the ON time within one DRX cycle, e.g., the amount of time the UE monitors for the PDCCH. The drx-Inactivity timer may specify the amount of time the UE may remain ON after the reception of a PDCCH. When the drx-Inactivity timer is on, the UE may remain in an ON state which may extend the UE ON period into the period which is otherwise an OFF period. The drx-Retransmission timer may specify the maximum number of consecutive PDCCH subframes that the UE may remain active to wait for an incoming retransmission after the first available retransmission time. The shortDRX-Cycle may be a DRX cycle that may be implemented within the OFF period of a long DRX cycle. Also, the drxShortCycleTimer may be the consecutive number of subframes that the UE follows the short DRX cycle after the DRX inactivity timer has expired.

Some aspects of wireless communication may utilize different types of DRX configurations. For instance, for communications between a UE and a universal mobile telecommunications system terrestrial radio access network (UTRAN) (i.e., via a UE-UTRAN (Uu) interface), aspects of wireless communication may utilize Uu DRX configurations. For communications between UEs, aspects of wireless communication may utilize sidelink (SL) DRX configurations. Additionally, aspects of wireless communications may align Uu DRX configurations with SL DRX configurations. In some instances, the alignment of Uu DRX configurations and SL DRX configurations may be utilized for UEs, e.g., a transmitting (Tx) UE and a receiving (Rx) UE, in different radio resource control (RRC) modes, e.g., RRC IDLE mode, RRC INACTIVE mode, and/or RRC CONNECTED mode. Some alignment between a Tx UE's Uu DRX configuration and an Rx UE's SL DRX configurations may be considered to ensure that an SL grant scheduled for the Tx UE during its Uu DRX active time falls into the SL DRX active time of the Rx UE.

Figure 6:
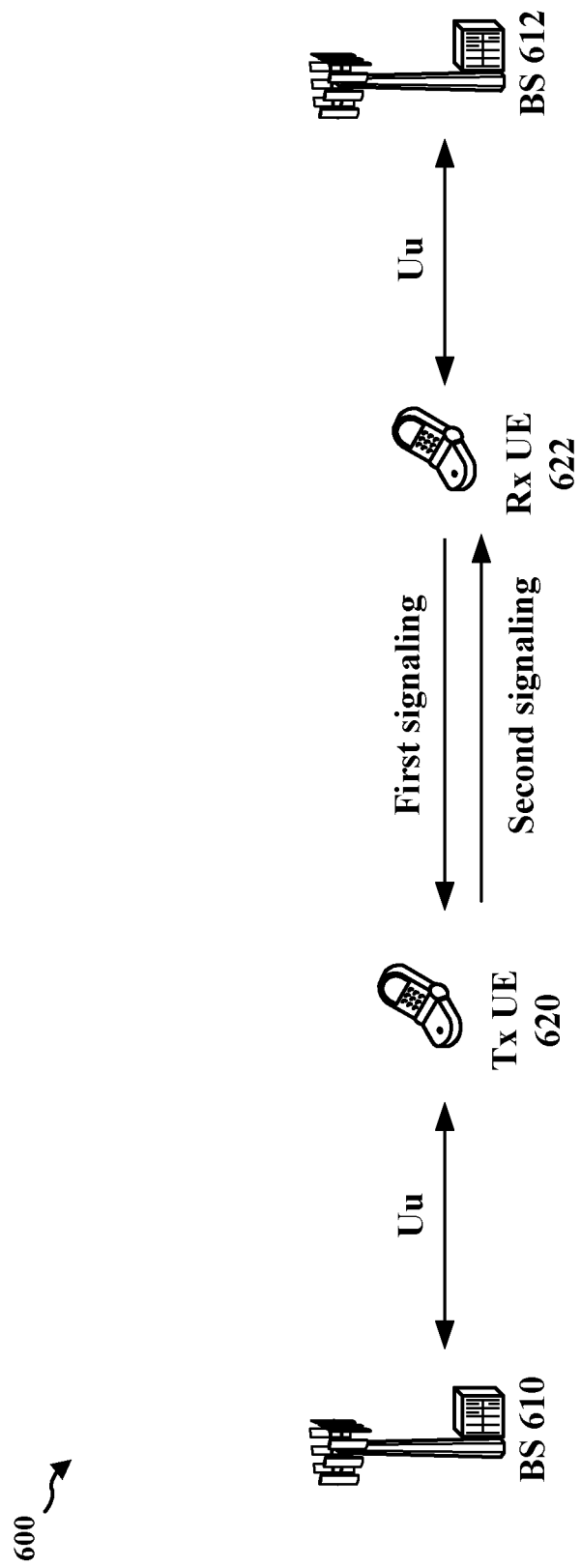
FIG. 6 is a diagram illustrating an example of communication between UEs and base stations.

FIG. 6 is a diagram 600 illustrating an example communication between base stations and UEs (e.g., a Tx UE and an Rx UE). As shown in FIG. 6, diagram 600 includes base station (BS) 610, base station 612, Tx UE 620, and Rx UE 622. More specifically, diagram 600 depicts Tx UE 620 and Rx UE 622 are connected via sidelink, while base station 610 and Tx UE 620 are connected via a Uu interface and base station 612 and Rx UE 622 are connected via a Uu interface. Indeed, Tx UE 620 and Rx UE 622 are connected on sidelink, and each UE 610/612 is connected with base station 610/612, respectively, via a Uu interface. In some aspects, base station 610 (i.e., the base station for Tx UE 620) and base station 612 (i.e., the base station for Rx UE 622) may be responsible for the alignment of SL DRX and Uu DRX configurations.

Figure 7:
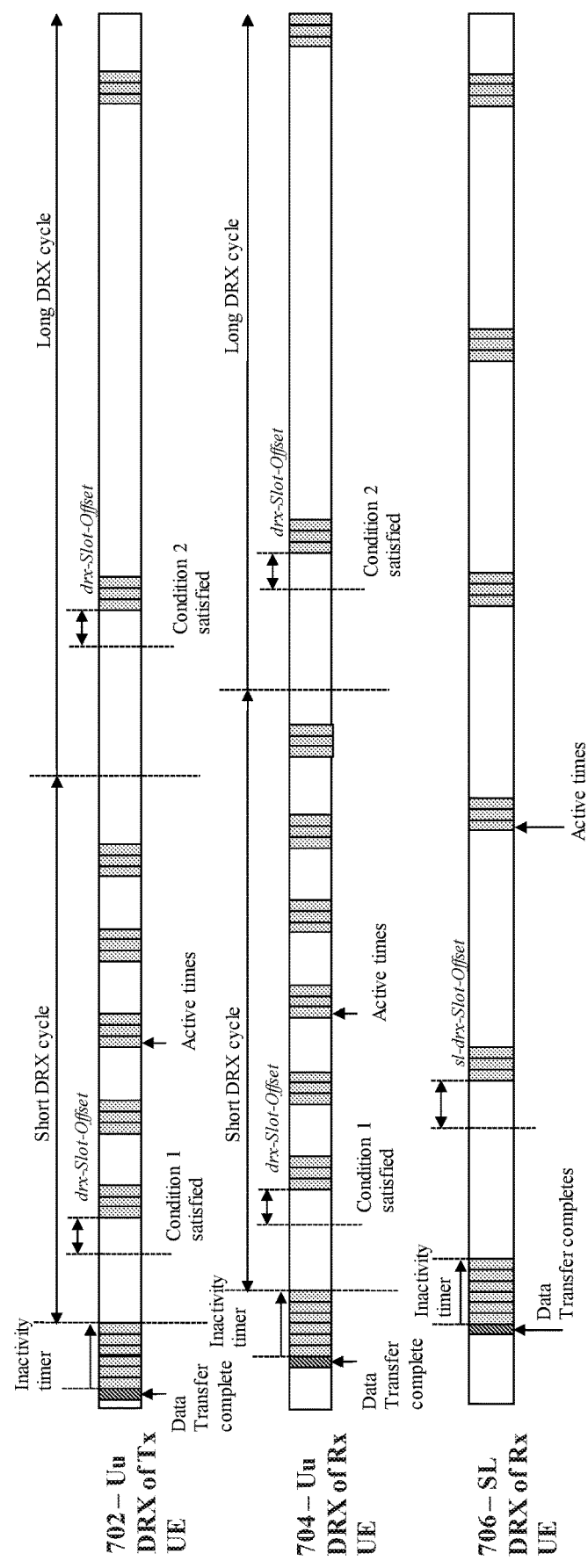
FIG. 7 is a diagram illustrating an example of Uu DRX and SL DRX configuration timing before alignment.

FIG. 7 is a diagram 700 illustrating an example of Uu DRX and SL DRX configuration timing before alignment. As shown in FIG. 7, diagram 700 includes a timing for Uu DRX configuration 702 (i.e., the Uu DRX configuration of a Tx UE), Uu DRX configuration 704 (i.e., the Uu DRX configuration of an Rx UE), and SL DRX configuration 706 (i.e., the SL DRX configuration of the Rx UE). More specifically, diagram 700 depicts the timing for Uu DRX configuration 702, Uu DRX configuration 704, and SL DRX configuration 706 before they are aligned with each other. FIG. 7 also displays a short DRX cycle, a long DRX cycle, an inactivity timer, a time when a data transfer is completed, active times, slot offsets (e.g., drx-Slot-Offset and sl-drx-Slot-Offset), and times when certain conditions (e.g., condition 1 and condition 2) are satisfied.

Figure 8:
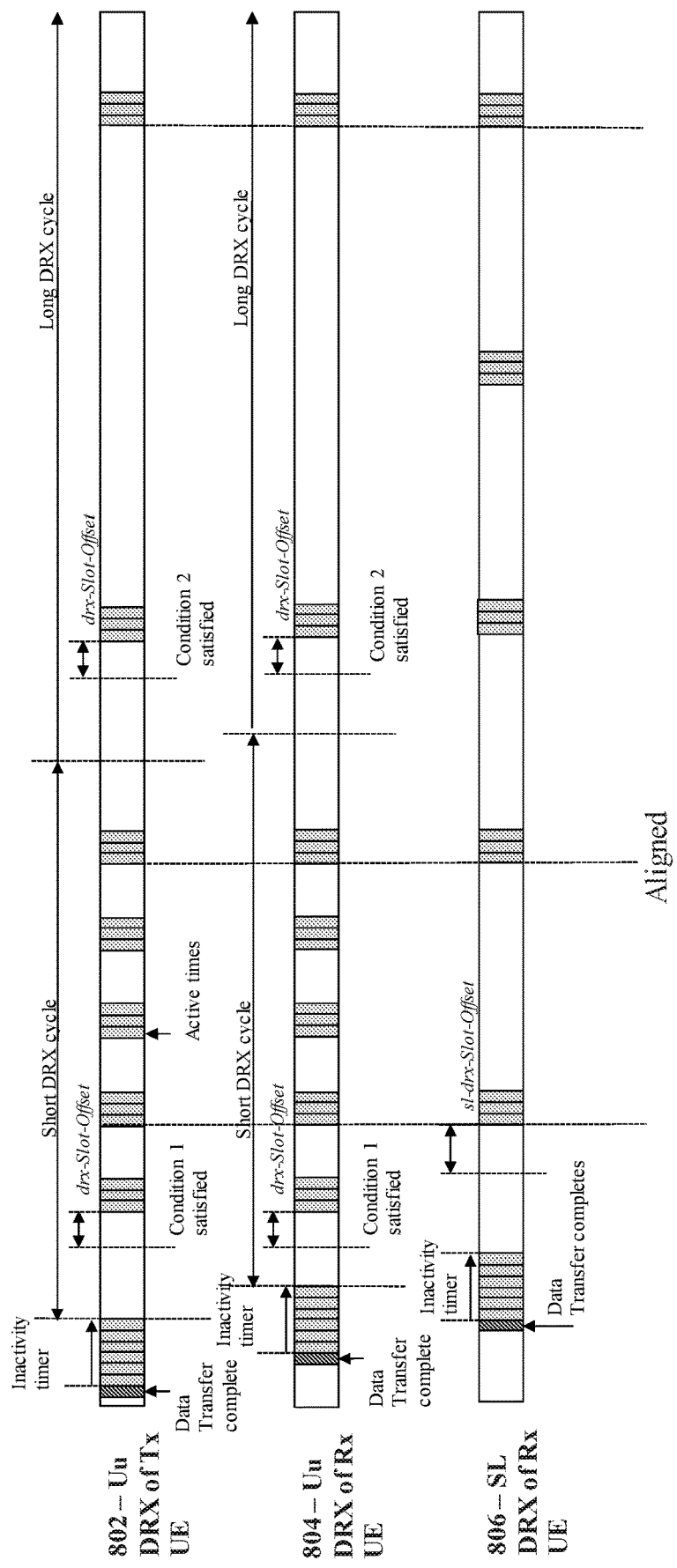
FIG. 8 is a diagram illustrating an example of Uu DRX and SL DRX configuration timing after alignment.

FIG. 8 is a diagram 800 illustrating an example of Uu DRX and SL DRX configuration timing after alignment. As shown in FIG. 8, diagram 800 includes a timing for Uu DRX configuration 802 (i.e., the Uu DRX configuration of a Tx UE), Uu DRX configuration 804 (i.e., the Uu DRX configuration of an Rx UE), and SL DRX configuration 806 (i.e., the SL DRX configuration of the Rx UE). More specifically, diagram 800 depicts the timing for Uu DRX configuration 802, Uu DRX configuration 804, and SL DRX configuration 806 after they are aligned with each other. FIG. 8 also displays a short DRX cycle, a long DRX cycle, an inactivity timer, a time when a data transfer is completed, active times, slot offsets (e.g., drx-Slot-Offset and sl-drx-Slot-Offset), times when certain conditions (e.g., condition 1 and condition 2) are satisfied, and the alignment of each of the configurations.

Some types of wireless communication may utilize different types of alignment between Uu DRX and SL DRX configurations. For instance, there may be an alignment of Uu DRX and SL DRX configurations for an Rx UE. Also, there may be an alignment of an Rx UE's SL DRX configuration with a Tx UE's Uu DRX configuration. In some instances, if both a Tx UE's Uu DRX configuration and an Rx UE's Uu DRX configuration are aligned with an Rx UE's SL DRX configuration, then all 3 of these DRX cycles may be aligned. By aligning all 3 configurations, the signaling may be optimized and a unified procedure may be present if the signaling covers all of these configurations.

As indicated herein, there may be different RRC states for DRX configuration alignments. For instance, a Tx UE may be in an RRC connected state, an RRC inactive state, or an RRC idle state. Also, an Rx UE may be in an RRC connected state. In some instances, DRX alignment scenarios may include both a Tx UE and an Rx UE in RRC connected mode. Also, DRX alignment scenarios may include a Tx UE in RRC inactive/idle mode and an Rx UE in RRC connected mode.

DRX alignment scenarios may also utilize different information elements, e.g., an RRC information element (IE). The individual contents of an information element may be referred to as a field. Also, a structural element containing single or multiple fields may be referred to as an information element. An RRC IE may be contained in RRC messages and utilized to convey information. One type of RRC IE is DRX-Config, which may define an entire DRX configuration and may be utilized in the Uu interface between a base station and a UE. Another type of RRC IE is sl-DRX-Config, which may define an entire SL DRX configuration and may be utilized in the PC5 interface (i.e., the interface between UE/vehicles and other devices).

As indicated herein, some types of wireless communication may utilize inefficient types of DRX alignment, such as certain types of alignment for Uu DRX and SL DRX configurations. For example, some RRC IEs (e.g., DRX-Config and sl-DRX-Config) may convey the entire Uu DRX or SL DRX configuration, which may be an inefficient type of DRX alignment. As such, it may be beneficial to more efficiently align a Uu DRX configuration and an SL DRX configuration. For instance, it may be beneficial to utilize certain types of RRC IEs to efficiently align the Uu DRX configuration or the SL DRX configuration. Additionally, it may be beneficial to utilize different types of signaling between base stations and UEs to facilitate the procedure for Uu DRX and SL DRX alignment.

Aspects of the present disclosure may more efficiently align a Uu DRX configuration and an SL DRX configuration. For instance, aspects of the present disclosure may utilize certain types of RRC IEs (e.g., DRX-Config-Alignment and/or sl-DRX-Config-Alignment) to efficiently align the Uu DRX configuration and the SL DRX configuration. Additionally, in some instances, aspects of the present disclosure may utilize different types of signaling between base stations and UEs to facilitate the procedure for Uu DRX and SL DRX alignment. More specifically, aspects of the present disclosure may utilize layer 1 (L1), layer 2 (L2), and/or layer 3 (L3) signaling between base stations and UEs to facilitate the procedure for Uu DRX and SL DRX alignment.

In order to align the Uu DRX configuration and the SL DRX configuration, aspects of the present disclosure may use certain types of RRC IEs (e.g., DRX-Config, DRX-Config-Alignment, sl-DRX-Config, and/or sl-DRX-Config-Alignment). For instance, the base station and UE may utilize DRX-Config or DRX-Config-Alignment to convey the parameters in the Uu DRX configuration. Also, the base station and UE may utilize either sl-DRX-Config or sl-DRX-Config-Alignment to convey the parameters in the SL DRX configuration. These RRC IEs may be contained in certain messages (e.g., assistance information message, SL DRX configuration message, or Uu DRX configuration message) that are transmitted between the base station and UEs. In some instances, certain RRC IEs may define the parameters that are related to a corresponding alignment. For example, DRX-Config-Alignment may define the parameters that are related to the Uu DRX configuration alignment, while sl-DRX-Config-Alignment may define the parameters that are related to the SL DRX configuration alignment.

Figure 9:
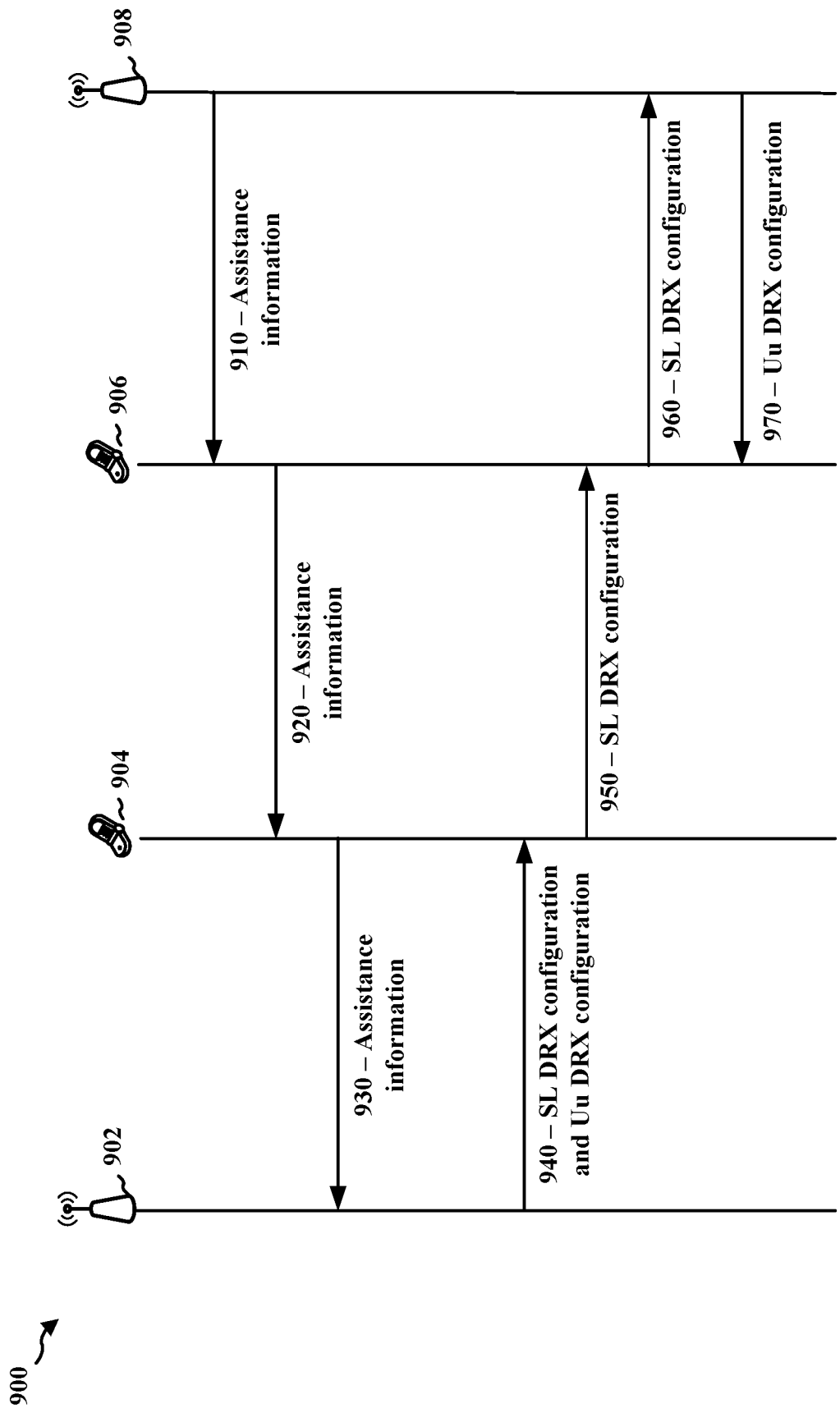
FIG. 9 is a diagram illustrating an example communication flow between base stations and UEs.

FIG. 9 is a diagram 900 illustrating an example communication flow between base stations and UEs (e.g., an Rx UE and a Tx UE). As shown in FIG. 9, diagram 900 includes base station 902, Tx UE 904, Rx UE 906, and base station 908. More specifically, diagram 900 depicts example communication flow between Tx UE 904 and its corresponding base station (e.g., base station 902) and Rx UE 906 and its corresponding base station (e.g., base station 908). As illustrated in FIG. 9, base stations 902/908 and UEs 904/906 may transmit different types of message between one another. For instance, base stations 902/908 and UEs 904/906 may transmit assistance information (e.g., an assistance information message/indication), an SL DRX configuration (e.g., SL DRX configuration message/indication), and/or a Uu DRX configuration (e.g., a Uu DRX configuration message/indication).

As shown in FIG. 9, at 910, base station 908 may send assistance information (e.g., an assistance information message and/or an indication of assistance information), to Rx UE 906. At 920, Rx UE 906 may transmit the assistance information (e.g., an assistance information message and/or an indication of assistance information) to Tx UE 904. At 930, Tx UE 904 may transmit/report the assistance information (e.g., an assistance information message and/or an indication of assistance information) to base station 902. After receiving the assistance information, base station 902 may determine or configure an SL DRX configuration and/or a Uu DRX configuration. For example, base station 902 may determine or configure an SL DRX configuration for Rx UE 906 and/or a Uu DRX configuration for Tx UE 904.

At 940, after determining or configuration the SL DRX configuration and/or Uu DRX configuration, the base station 902 may transmit the SL DRX configuration (e.g., an SL DRX configuration message and/or an indication of the SL DRX configuration) and/or the Uu DRX configuration (e.g., a Uu DRX configuration message and/or an indication of the Uu DRX configuration) to Tx UE 904. At 950, Tx UE 904 may send/forward the SL DRX configuration (e.g., an SL DRX configuration message and/or an indication of the SL DRX configuration) to the Rx UE 906. At 960, Rx UE 906 may send/report the SL DRX configuration (e.g., an SL DRX configuration message and/or an indication of the SL DRX configuration) to the base station 908. After receiving the SL DRX configuration, base station 908 may adjust/configure a Uu DRX configuration for Rx UE 906 in order to achieve the alignment with the SL DRX configuration. At 970, base station 908 may transmit the adjusted/configured Uu DRX configuration to Rx UE 906.

As depicted in FIG. 9, a base station for a Tx UE may determine/configuration an SL DRX configuration for an Rx UE and/or a Uu DRX configuration for a Tx UE based on assistance information. The assistance information may contain a variety of information including at least one of: the Rx UE's Uu DRX configuration, a list of the Rx UE's available Uu DRX configurations, existing SL DRX configurations from other Tx UEs, or a suitable SL DRX configuration from the Rx UE or Rx UE's base station. Regarding the Rx UE's Uu DRX configuration, the Tx UE's base station may select the SL DRX configuration that is aligned with the Rx UE's Uu DRX configuration. For the list of the Rx UE's available Uu DRX configurations, the Tx UE's base station may align the Uu DRX configuration with one of the available Uu DRX configurations. Concerning the existing SL DRX configurations from other Tx UEs, the Tx UE's base station may select an SL DRX configuration that does not overlap with existing SL DRX configurations from other Tx UEs. For the suitable SL DRX configuration from the Rx UE or Rx UE's base station, the Rx UE may take into account its Uu DRX configuration when requesting the suitable SL DRX configuration.

In some aspects, the assistance information may include the Uu DRX configuration (e.g., the Rx UE's Uu DRX configuration) and may be transmitted via layer 3 (L3) signaling. For instance, an RRC message may contain the Uu DRX configuration. This message may contain the whole Uu DRX configuration, e.g., using RRC IE DRX-Config. The message may also contain a subset of the Uu DRX configuration which is related to alignment, e.g., using RRC IE DRX-Config-Alignment.

The Uu DRX configuration (e.g., the Rx UE's Uu DRX configuration) may also be transmitted via layer 1 (L1) or layer 2 (L2) signaling. For L2 signaling, a MAC-CE may convey the relevant Uu DRX configuration (e.g., drx-LongCycleStartOffset, drx-Short-Cycle, or drx-SlotOffset). In some instances, short DRX information may be included if it is configured for Uu as a short DRX cycle. FIG. 10A is a diagram 1000 illustrating an example MAC-CE format, e.g., the MAC-CE format that may convey the relevant Uu DRX configuration. As shown in FIG. 10A, the MAC-CE may be designed such that it has a variable length. The MAC-CE in FIG. 10A includes several octets (Oct), e.g., a first Oct (Oct1), a second Oct (Oct2), and a third Oct (Oct3). The base station may also set a subset of values for the update, e.g., drx-Slot-Offset may have 32 values, such that the base station may inform UEs that the updated value in the MAC-CE is one of 8 values in a subset. Additionally, for L1/L2 signaling, the RRC message may configure a set of values for a relevant Uu DRX configuration (e.g., drx-LongCycleStartOffset, shortDRX, or drx-SlotOffset) and L1/L2 signaling may be used to point to one of these values. For example, this may be a pointer to a list to minimize the overhead.

In some aspects, the assistance information may include a list of available Uu DRX configurations for the Rx UE. For instance, instead of a single Uu DRX configuration in the assistance information, the assistance information may include a list of possible Uu DRX configurations, so that the Tx UE's base station may align with one of the Uu DRX configurations. Because the selected SL DRX configuration may align with one of the Uu DRX configurations provided by Rx UE's base station, the Rx UE's base station may be able to align the Uu DRX configuration with the selected SL DRX configuration. Also, the list of Uu DRX configurations may be sorted in order of suitability, e.g., a descending or ascending order of suitability.

The assistance information may include the list of available Uu DRX configurations for the Rx UE and may be transmitted via L3 signaling. For instance, an RRC message may contain the Uu DRX configuration candidates. This message may contain the whole Uu DRX configuration and candidates. The message may also contain the parameters related to alignment.

The list of available Uu DRX configurations for the Rx UE may also be transmitted via L1 or L2 signaling. For L2 signaling, a MAC-CE may convey the relevant Uu DRX configuration candidates (e.g., drx-LongCycleStartOffset, drx-Short-Cycle, or drx-SlotOffset). In some instances, the short DRX information may be included if it is configured for Uu as a short DRX cycle. FIG. 10B is a diagram 1020 illustrating an example MAC-CE format, e.g., the MAC-CE format that may convey the list of available Uu DRX configurations. As shown in FIG. 10B, the MAC-CE may be designed such that it has a variable length. The base station may also set a subset of values for the update, e.g., drx-Slot-Offset may have 32 values, such that the base station may inform UEs that the updated value in the MAC-CE is one of 8 values in a subset. For L1/L2 signaling, the RRC message may configure a set of values for relevant Uu DRX configuration candidates (e.g., drx-LongCycleStartOffset, shortDRX, or drx-SlotOffset) and L1/L2 signaling may be used to point to one of these values. For example, this may be a pointer to a list to minimize the overhead.

Additionally, the assistance information may include existing SL DRX configurations from other Tx UEs. For instance, the Rx UE may have SL connections with multiple Tx UEs, where each Tx UE may set an SL DRX configuration for the Rx UE. The Tx UE may need to set an SL DRX configuration based on existing SL DRX configurations and the UE's capability. If the Rx UE cannot monitor signaling/message from different Tx UEs simultaneously, the active times of each SL DRX configuration may not overlap (e.g., this may work on FR2 and/or a single panel). If the Rx UE monitors the signaling/message from different Tx UEs simultaneously, the active times of different SL DRX configurations may overlap (e.g., this may work on FR1 or multiple panels). Also, the Tx UE's base station may select the SL DRX configuration that does not overlap with existing SL DRX configurations from other Tx UEs.

The assistance information may include the existing SL DRX configurations from other Tx UEs and may be transmitted via L3 signaling. For instance, an RRC message may contain the existing SL DRX configurations from other Tx UEs. This message may contain the whole SL DRX configuration and candidates. The message may also contain the parameters related to alignment.

The existing SL DRX configurations from other Tx UEs may also be transmitted via L1 or L2 signaling. For L2 signaling, a MAC-CE may convey the relevant SL DRX configurations (e.g., sl-drx-StartOffset, sl-drx-Cycle, or sl-drx-SlotOffset). FIG. 10C is a diagram 1040 illustrating an example MAC-CE format, e.g., the MAC-CE format that may convey the existing SL DRX configurations from other Tx UEs. As shown in FIG. 10C, the MAC-CE may be designed such that it has a variable length. The base station may also set a subset of values for the update, e.g., sl-drx-Slot-Offset may have 32 values, such that the base station may inform UEs that the updated value in the MAC-CE is one of 8 values in a subset. For L1/L2 signaling, the RRC message may configure a set of values for relevant SL DRX configurations (e.g., sl-drx-StartOffset, sl-drx-Cycle, or sl-drx-SlotOffset) and L1/L2 signaling may be used to point to one of these values. For example, this may be a pointer to a list to minimize the overhead.

Moreover, the assistance information may include a suitable SL DRX configuration from the Rx UE or Rx UE's base station. For instance, the Rx UE's base station may provide a list of the suitable SL DRX configurations, which may be compatible with the Rx UE's Uu DRX configuration. The suitable SL DRX configuration may be aligned with a current Rx UE's Uu DRX configuration. Also, in some instances, the suitable SL DRX configuration may not be aligned with current Rx UE's Uu DRX, but it may be possible for Rx UE's base station to align the Rx UE's Uu DRX configuration with the SL DRX configuration, as it may be provided by the Rx UE's base station.

The assistance information may include the suitable SL DRX configurations from the Rx UE or Rx UE's base station via L3 signaling. For instance, an RRC message may contain the list of suitable SL DRX configurations. This message may contain the whole SL DRX configuration and candidates. The message may also contain the parameters related to alignment. Also, the suitable SL DRX configurations from the Rx UE or Rx UE's base station may be transmitted via L1 or L2 signaling. For L2 signaling, a MAC-CE (e.g., the MAC-CE in FIG. 10C) may convey the relevant SL DRX configurations (e.g., sl-drx-StartOffset, sl-drx-Cycle, or sl-drx-SlotOffset). For L1/L2 signaling, the RRC message may configure a set of values for relevant SL DRX configurations (e.g., sl-drx-StartOffset, sl-drx-Cycle, or sl-drx-SlotOffset) and L1/L2 signaling may be used to point to one of these values.

The SL DRX configuration message (or indication of the SL DRX configuration) may be transmitted from a Tx UE's base station to a Tx UE, transmitted from a Tx UE to an Rx UE, or transmitted from an Rx UE to the Rx UE's base station. The Tx UE's base station may make decisions for the Rx UE's SL DRX configuration, and the Tx UE may forward this SL DRX configuration to the Rx UE. The Rx UE may then report its SL DRX configuration to its corresponding base station. The SL DRX configuration message (or indication of the SL DRX configuration) may contain the SL DRX configuration for the Rx UE, including the SL DRX parameters related to the alignment between the SL DRX configuration and the Uu DRX configuration (e.g., sl-drx-StartOffset, sl-drx-Cycle, and/or sl-drx-SlotOffset).

The SL DRX configuration message (or indication of the SL DRX configuration) may be transmitted via L3 signaling. For instance, an RRC message may contain the SL DRX configuration. This message may contain the whole SL DRX configuration, i.e., using SL RRC IE sl-DRX-Config. The message may also contain a subset of SL DRX configuration which is related to alignment, i.e., using SL RRC IE sl-DRX-Config-Alignment.

The SL DRX configuration message (or indication of the SL DRX configuration) may also be transmitted via L1 or L2 signaling. For L2 signaling, a MAC-CE may convey the relevant SL DRX configurations (e.g., sl-drx-StartOffset, sl-drx-Cycle, or sl-drx-SlotOffset). FIG. 10D is a diagram 1060 illustrating an example MAC-CE format, e.g., the MAC-CE format that may convey the SL DRX configuration. As shown in FIG. 10D, the MAC-CE may be designed such that it has a variable length. The base station may also set a subset of values for the update, e.g., sl-drx-Slot-Offset may have 32 values, such that the base station may inform UEs that the updated value in the MAC-CE is one of 8 values in a subset. For L1/L2 signaling, the RRC message may configure a set of values for relevant SL DRX configurations (e.g., sl-drx-StartOffset, sl-drx-Cycle, or sl-drx-SlotOffset) and L1/L2 signaling may be used to point to one of these values. For example, this may be a pointer to a list to minimize the overhead.

The Uu DRX configuration message (or indication of the Uu DRX configuration) may be transmitted from a Tx UE's base station to a Tx UE and/or transmitted from an Rx UE's base station to an Rx UE. The Tx UE and the Rx UE may receive their Uu DRX configuration from their corresponding base stations, respectively. The Uu DRX configuration message (or indication of the Uu DRX configuration) may contain the Uu DRX configuration for the UE, including the Uu DRX parameters related to the alignment between the SL DRX configuration and the Uu DRX configuration (e.g., drx-LongCycleStartOffset, shortDRX, drx-ShortCycle, drx-ShortCycleTimer, and/or drx-SlotOffset).

The Uu DRX configuration message (or indication of the Uu DRX configuration) may be transmitted via L3 signaling. For instance, an RRC message may contain the Uu DRX configuration. This message may contain the whole Uu DRX configuration, i.e., using RRC IE DRX-Config. The message may also contain a subset of the Uu DRX configuration which is related to alignment, i.e., using RRC IE DRX-Config-Alignment. Also, the Uu DRX configuration message (or indication of the Uu DRX configuration) may be transmitted via L1 or L2 signaling. For L2 signaling, a MAC-CE may convey the relevant Uu DRX configuration (e.g., drx-LongCycleStartOffset, drx-ShortCycle, and/or drx-SlotOffset), such as the MAC-CE in FIG. 10A. The short DRX information may be included if it is configured for Uu, as in some instances the short DRX cycle may not be included. For L1/L2 signaling, the RRC message may configure a set of values for relevant Uu DRX configurations (e.g., drx-LongCycleStartOffset, shortDRX, or drx-SlotOffset) and L1/L2 signaling may be used to point to one of these values.

In some aspects, L1/L2 signaling may be used after the initial DRX configuration setup based on L3 signaling. For instance, the UE may make a decision on changing the DRX configuration among RRC configured options and then notify the base station via L1/L2 signaling. Additionally, for the alignment of the Tx UE's Uu DRX configuration and the Rx UE's SL DRX configuration, an on-time duration (onDuration) of active times may be optimized. In some instances, the length of the Rx UE's onDuration may be no less than the Tx UE's Uu DRX onDuration. This may be performed to ensure that the SL grant scheduled for the TX UE during its Uu DRX active time falls into the SL DRX active time of the peer RX UE. Also, the drx-onDuration Timer may be included in the DRX-Config-Alignment and the sl-drx-onDurationTimer may be included in the sl-DRX-Config-Alignment, so that the Tx UE or the Tx UE's base station may adjust the SL DRX configuration and the Rx UE's base station may adjust the Uu DRX configuration.

Figure 11:
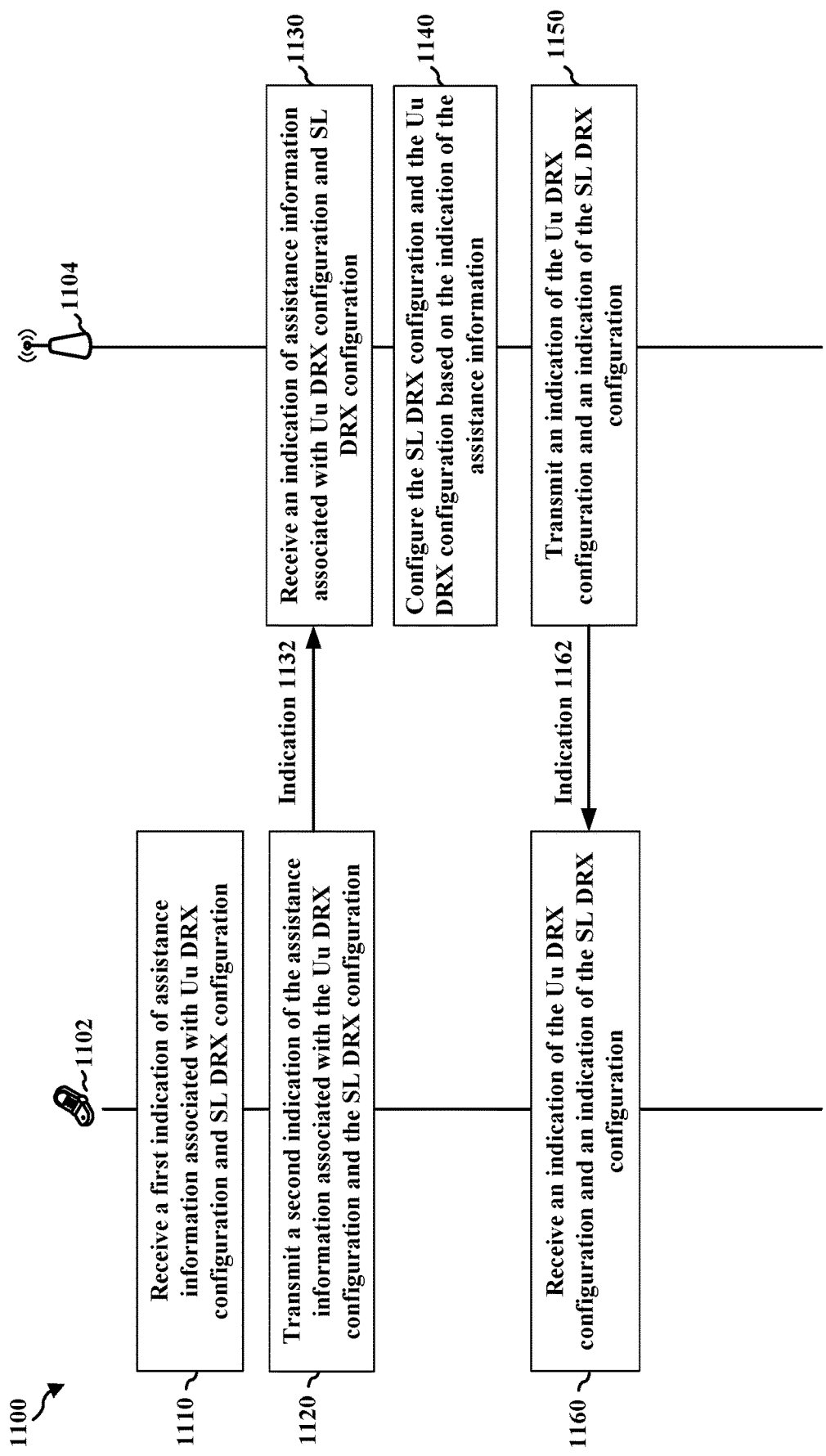
FIG. 11 is a diagram illustrating example communication between a UE and a base station.

FIG. 11 is a diagram 1100 illustrating example communication between a UE 1102 and a base station 1104.

At 1110, UE 1102 may receive a first indication of assistance information associated with a UE-universal mobile telecommunications system terrestrial radio access network (UTRAN) (Uu) discontinuous reception (DRX) configuration and a sidelink (SL) DRX configuration.

At 1120, UE 1102 may transmit a second indication of the assistance information associated with the Uu DRX configuration and the SL DRX configuration (e.g., indication 1132).

In some aspects, the first indication may be received from a base station and the second indication may be transmitted to at least one other UE. Also, the first indication may be received from at least one other UE and the second indication may be transmitted to a base station. The first indication may be received via layer 3 (L3) signaling or a radio resource control (RRC) message, and the second indication may be transmitted via the L3 signaling or the RRC message. Further, the first indication may be received via layer 1 (L1) signaling, layer 2 (L2) signaling, or a medium access control (MAC) control element (MAC-CE), and the second indication may be transmitted via the L1 signaling, the L2 signaling, or the MAC-CE.

The assistance information associated with the Uu DRX configuration and the SL DRX configuration may correspond to at least one of: (1) a current Uu DRX configuration of the UE, (2) a list of available Uu DRX configurations of the UE, (3) one or more existing SL DRX configurations of at least one other UE, or (4) at least one suitable SL DRX configuration for the UE. The list of the available Uu DRX configurations may include all of the available Uu DRX configurations or a subset of the available Uu DRX configurations. The current Uu DRX configuration may be associated with a long DRX cycle, a short DRX cycle, a DRX slot offset, or a starting offset of the long DRX cycle. The Uu DRX configuration may be adjusted to align with the SL DRX configuration based on at least one available Uu DRX configuration of the list of available Uu DRX configurations. The list of the available Uu DRX configurations may be based on a suitability of each of the available Uu DRX configurations. The SL DRX configuration may be based on the one or more existing SL DRX configurations and a capability of the UE, and the SL DRX configuration may not overlap with the one or more existing SL DRX configurations. The at least one suitable SL DRX configuration for the UE may be aligned with the current Uu DRX configuration of the UE.

At 1130, base station 1104 may receive, from a UE (e.g., UE 1102), an indication of assistance information associated with a UE-universal mobile telecommunications system terrestrial radio access network (UTRAN) (Uu) discontinuous reception (DRX) configuration and a sidelink (SL) DRX configuration (e.g., indication 1132).

At 1140, base station 1104 may configure the SL DRX configuration and the Uu DRX configuration based on the indication of the assistance information.

At 1150, base station 1104 may transmit, to the UE (e.g., UE 1102), an indication of the SL DRX configuration and an indication of the Uu DRX configuration (e.g., indication 1162).

At 1160, UE 1102 may receive an indication of the Uu DRX configuration and an indication of the SL DRX configuration (e.g., indication 1162).

In some aspects, the indication of the SL DRX configuration may be received from at least one other UE and the indication of the Uu DRX configuration may be received from a base station. Further, the indication of the Uu DRX configuration and the indication of the SL DRX configuration may be received from a base station. The indication of the Uu DRX configuration and the indication of the SL DRX configuration may be received via layer 3 (L3) signaling or a radio resource control (RRC) message. Also, the indication of the Uu DRX configuration and the indication of the SL DRX configuration may be received via layer 1 (L1) signaling, layer 2 (L2) signaling, or a medium access control (MAC) control element (MAC-CE).

Additionally, the indication of the SL DRX configuration may include one or more SL DRX parameters associated with an alignment of the Uu DRX configuration and the SL DRX configuration. The one or more SL DRX parameters may include at least one of: an SL DRX cycle, an SL DRX starting offset, or an SL DRX slot offset. Further, the indication of the Uu DRX configuration may include one or more Uu DRX parameters associated with an alignment of the Uu DRX configuration and the SL DRX configuration. The one or more Uu DRX parameters may include at least one of: a Uu DRX long cycle, a starting offset for the Uu DRX long cycle, a Uu DRX short cycle, a timer for the Uu DRX short cycle, or a Uu DRX slot offset.

Figure 12:
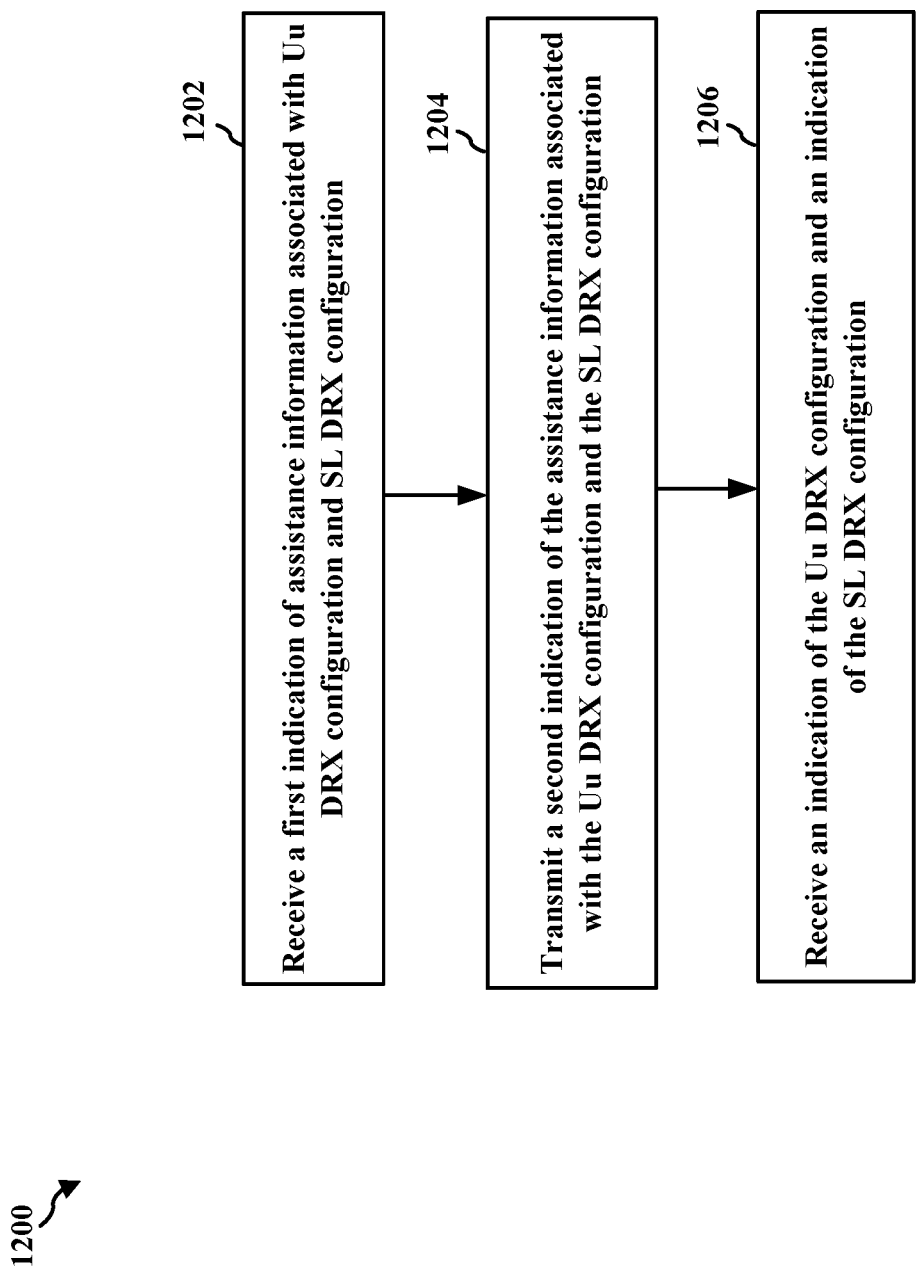
FIG. 12 is a flowchart of a method of wireless communication.

FIG. 12 is a flowchart 1200 of a method of wireless communication. The method may be performed by a UE or a component of a UE (e.g., the UE 104, 350, 620, 622, 904, 906, 1102; the apparatus 1602). The methods described herein may provide a number of benefits, such as improving communication signaling, resource utilization, and/or power savings.

At 1202, the UE may receive a first indication of assistance information associated with a UE-universal mobile telecommunications system terrestrial radio access network (UTRAN) (Uu) discontinuous reception (DRX) configuration and a sidelink (SL) DRX configuration, as described in connection with the examples in FIGS. 4-11. For example, UE 1102 may receive a first indication of assistance information associated with a UE-universal mobile telecommunications system terrestrial radio access network (UTRAN) (Uu) discontinuous reception (DRX) configuration and a sidelink (SL) DRX configuration, as described in connection with 1110 in FIG. 11. Further, 1202 may be performed by determination component 1640 in FIG. 16.

At 1204, the UE may transmit a second indication of the assistance information associated with the Uu DRX configuration and the SL DRX configuration, as described in connection with the examples in FIGS. 4-11. For example, UE 1102 may transmit a second indication of the assistance information associated with the Uu DRX configuration and the SL DRX configuration, as described in connection with 1120 in FIG. 11. Further, 1204 may be performed by determination component 1640 in FIG. 16.

In some aspects, the first indication may be received from a base station and the second indication may be transmitted to at least one other UE. Also, the first indication may be received from at least one other UE and the second indication may be transmitted to a base station. The first indication may be received via layer 3 (L3) signaling or a radio resource control (RRC) message, and the second indication may be transmitted via the L3 signaling or the RRC message. Further, the first indication may be received via layer 1 (L1) signaling, layer 2 (L2) signaling, or a medium access control (MAC) control element (MAC-CE), and the second indication may be transmitted via the L1 signaling, the L2 signaling, or the MAC-CE.

The assistance information associated with the Uu DRX configuration and the SL DRX configuration may correspond to at least one of: (1) a current Uu DRX configuration of the UE, (2) a list of available Uu DRX configurations of the UE, (3) one or more existing SL DRX configurations of at least one other UE, or (4) at least one suitable SL DRX configuration for the UE. The list of the available Uu DRX configurations may include all of the available Uu DRX configurations or a subset of the available Uu DRX configurations. The current Uu DRX configuration may be associated with a long DRX cycle, a short DRX cycle, a DRX slot offset, or a starting offset of the long DRX cycle. The Uu DRX configuration may be adjusted to align with the SL DRX configuration based on at least one available Uu DRX configuration of the list of available Uu DRX configurations. The list of the available Uu DRX configurations may be based on a suitability of each of the available Uu DRX configurations. The SL DRX configuration may be based on the one or more existing SL DRX configurations and a capability of the UE, and the SL DRX configuration may not overlap with the one or more existing SL DRX configurations. The at least one suitable SL DRX configuration for the UE may be aligned with the current Uu DRX configuration of the UE.

At 1206, the UE may receive an indication of the Uu DRX configuration and an indication of the SL DRX configuration, as described in connection with the examples in FIGS. 4-11. For example, UE 1102 may receive an indication of the Uu DRX configuration and an indication of the SL DRX configuration, as described in connection with 1160 in FIG. 11. Further, 1206 may be performed by determination component 1640 in FIG. 16.

In some aspects, the indication of the SL DRX configuration may be received from at least one other UE and the indication of the Uu DRX configuration may be received from a base station. Further, the indication of the Uu DRX configuration and the indication of the SL DRX configuration may be received from a base station. The indication of the Uu DRX configuration and the indication of the SL DRX configuration may be received via layer 3 (L3) signaling or a radio resource control (RRC) message. Also, the indication of the Uu DRX configuration and the indication of the SL DRX configuration may be received via layer 1 (L1) signaling, layer 2 (L2) signaling, or a medium access control (MAC) control element (MAC-CE).

Additionally, the indication of the SL DRX configuration may include one or more SL DRX parameters associated with an alignment of the Uu DRX configuration and the SL DRX configuration. The one or more SL DRX parameters may include at least one of: an SL DRX cycle, an SL DRX starting offset, or an SL DRX slot offset. Further, the indication of the Uu DRX configuration may include one or more Uu DRX parameters associated with an alignment of the Uu DRX configuration and the SL DRX configuration. The one or more Uu DRX parameters may include at least one of: a Uu DRX long cycle, a starting offset for the Uu DRX long cycle, a Uu DRX short cycle, a timer for the Uu DRX short cycle, or a Uu DRX slot offset.

Figure 13:
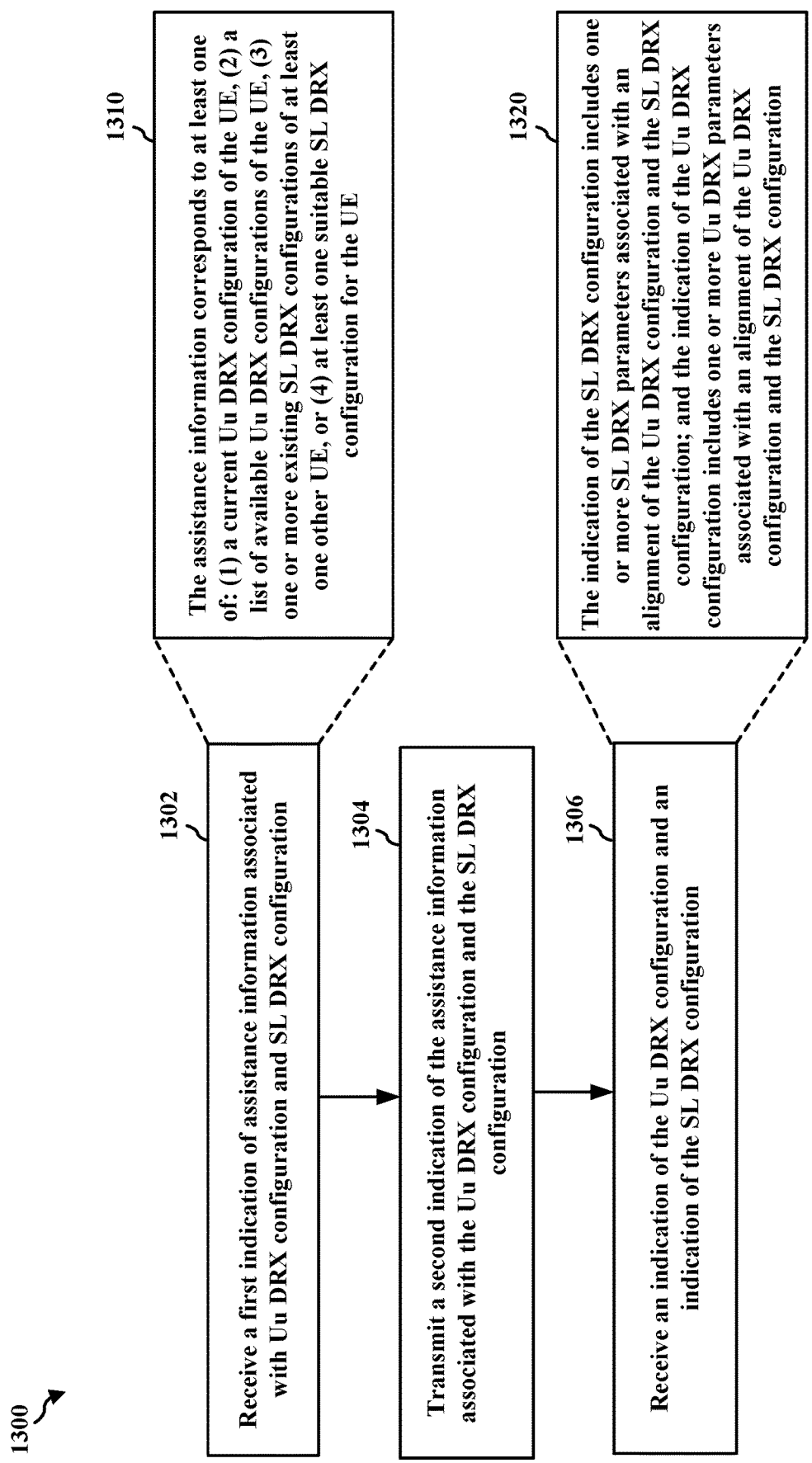
FIG. 13 is a flowchart of a method of wireless communication.

FIG. 13 is a flowchart 1300 of a method of wireless communication. The method may be performed by a UE or a component of a UE (e.g., the UE 104, 350, 620, 622, 904, 906, 1102; the apparatus 1602). The methods described herein may provide a number of benefits, such as improving communication signaling, resource utilization, and/or power savings.

At 1302, the UE may receive a first indication of assistance information associated with a UE-universal mobile telecommunications system terrestrial radio access network (UTRAN) (Uu) discontinuous reception (DRX) configuration and a sidelink (SL) DRX configuration, as described in connection with the examples in FIGS. 4-11. For example, UE 1102 may receive a first indication of assistance information associated with a UE-universal mobile telecommunications system terrestrial radio access network (UTRAN) (Uu) discontinuous reception (DRX) configuration and a sidelink (SL) DRX configuration, as described in connection with 1110 in FIG. 11. Further, 1302 may be performed by determination component 1640 in FIG. 16.

At 1304, the UE may transmit a second indication of the assistance information associated with the Uu DRX configuration and the SL DRX configuration, as described in connection with the examples in FIGS. 4-11. For example, UE 1102 may transmit a second indication of the assistance information associated with the Uu DRX configuration and the SL DRX configuration, as described in connection with 1120 in FIG. 11. Further, 1304 may be performed by determination component 1640 in FIG. 16.

In some aspects, the first indication may be received from a base station and the second indication may be transmitted to at least one other UE. Also, the first indication may be received from at least one other UE and the second indication may be transmitted to a base station. The first indication may be received via layer 3 (L3) signaling or a radio resource control (RRC) message, and the second indication may be transmitted via the L3 signaling or the RRC message. Further, the first indication may be received via layer 1 (L1) signaling, layer 2 (L2) signaling, or a medium access control (MAC) control element (MAC-CE), and the second indication may be transmitted via the L1 signaling, the L2 signaling, or the MAC-CE.

As shown at 1310, the assistance information associated with the Uu DRX configuration and the SL DRX configuration may correspond to at least one of: (1) a current Uu DRX configuration of the UE, (2) a list of available Uu DRX configurations of the UE, (3) one or more existing SL DRX configurations of at least one other UE, or (4) at least one suitable SL DRX configuration for the UE. The list of the available Uu DRX configurations may include all of the available Uu DRX configurations or a subset of the available Uu DRX configurations. The current Uu DRX configuration may be associated with a long DRX cycle, a short DRX cycle, a DRX slot offset, or a starting offset of the long DRX cycle. The Uu DRX configuration may be adjusted to align with the SL DRX configuration based on at least one available Uu DRX configuration of the list of available Uu DRX configurations. The list of the available Uu DRX configurations may be based on a suitability of each of the available Uu DRX configurations. The SL DRX configuration may be based on the one or more existing SL DRX configurations and a capability of the UE, and the SL DRX configuration may not overlap with the one or more existing SL DRX configurations. The at least one suitable SL DRX configuration for the UE may be aligned with the current Uu DRX configuration of the UE.

At 1306, the UE may receive an indication of the Uu DRX configuration and an indication of the SL DRX configuration, as described in connection with the examples in FIGS. 4-11. For example, UE 1102 may receive an indication of the Uu DRX configuration and an indication of the SL DRX configuration, as described in connection with 1160 in FIG. 11. Further, 1306 may be performed by determination component 1640 in FIG. 16.

In some aspects, the indication of the SL DRX configuration may be received from at least one other UE and the indication of the Uu DRX configuration may be received from a base station. Further, the indication of the Uu DRX configuration and the indication of the SL DRX configuration may be received from a base station. The indication of the Uu DRX configuration and the indication of the SL DRX configuration may be received via layer 3 (L3) signaling or a radio resource control (RRC) message. Also, the indication of the Uu DRX configuration and the indication of the SL DRX configuration may be received via layer 1 (L1) signaling, layer 2 (L2) signaling, or a medium access control (MAC) control element (MAC-CE).

As shown at 1320, the indication of the SL DRX configuration may include one or more SL DRX parameters associated with an alignment of the Uu DRX configuration and the SL DRX configuration. The one or more SL DRX parameters may include at least one of: an SL DRX cycle, an SL DRX starting offset, or an SL DRX slot offset. As further shown at 1320, the indication of the Uu DRX configuration may include one or more Uu DRX parameters associated with an alignment of the Uu DRX configuration and the SL DRX configuration. The one or more Uu DRX parameters may include at least one of: a Uu DRX long cycle, a starting offset for the Uu DRX long cycle, a Uu DRX short cycle, a timer for the Uu DRX short cycle, or a Uu DRX slot offset.

Figure 14:
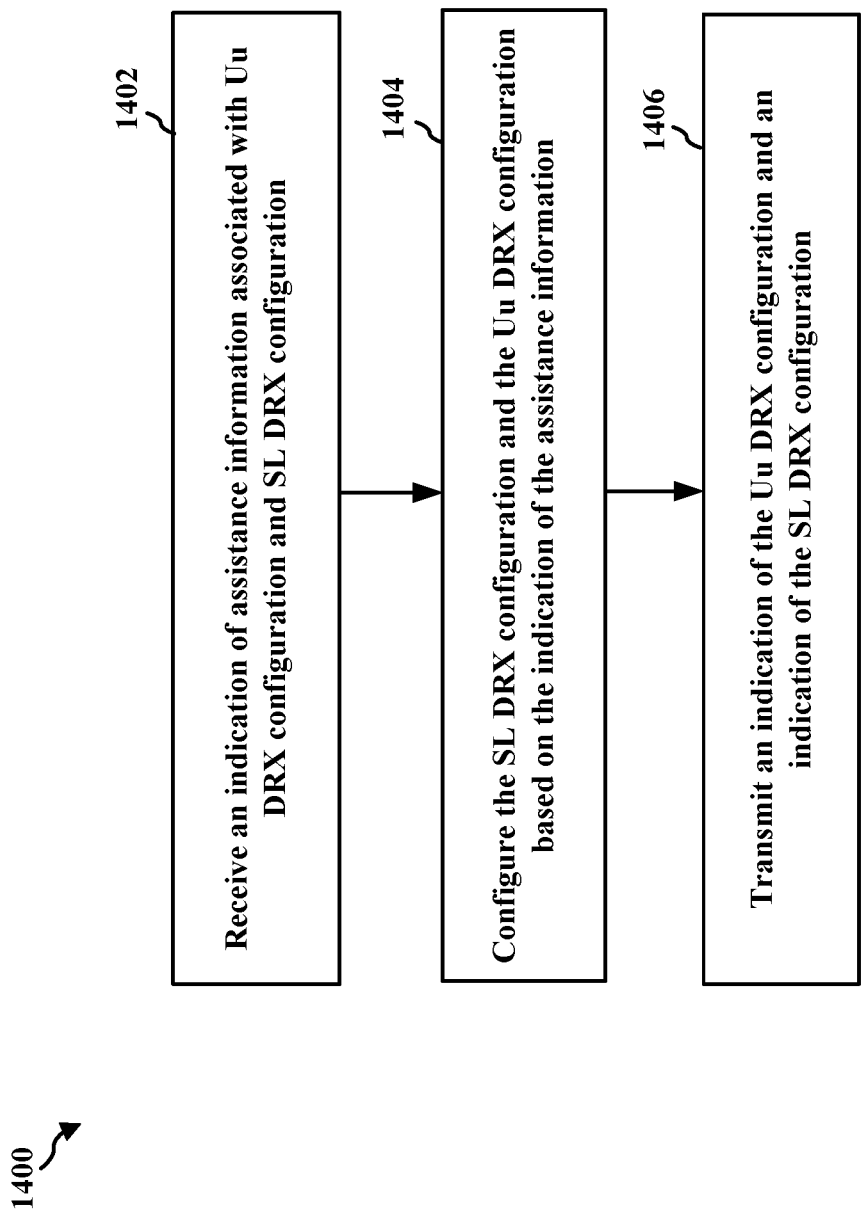
FIG. 14 is a flowchart of a method of wireless communication.

FIG. 14 is a flowchart 1400 of a method of wireless communication. The method may be performed by a base station or a component of a base station (e.g., the base station 102, 180, 310, 610, 612, 902, 908, 1104; the apparatus 1702). The methods described herein may provide a number of benefits, such as improving communication signaling, resource utilization, and/or power savings.

At 1402, the base station may receive, from a user equipment (UE), an indication of assistance information associated with a UE-universal mobile telecommunications system terrestrial radio access network (UTRAN) (Uu) discontinuous reception (DRX) configuration and a sidelink (SL) DRX configuration, as described in connection with the examples in FIGS. 4-11. For example, base station 1104 may receive, from a user equipment (UE), an indication of assistance information associated with a UE-universal mobile telecommunications system terrestrial radio access network (UTRAN) (Uu) discontinuous reception (DRX) configuration and a sidelink (SL) DRX configuration, as described in connection with 1130 in FIG. 11. Further, 1402 may be performed by determination component 1740 in FIG. 17.

The assistance information associated with the Uu DRX configuration and the SL DRX configuration may correspond to at least one of: (1) a current Uu DRX configuration of the UE, (2) a list of available Uu DRX configurations of the UE, (3) one or more existing SL DRX configurations of at least one other UE, or (4) at least one suitable SL DRX configuration for the UE. The list of the available Uu DRX configurations may include all of the available Uu DRX configurations or a subset of the available Uu DRX configurations. The current Uu DRX configuration may be associated with a long DRX cycle, a short DRX cycle, a DRX slot offset, or a starting offset of the long DRX cycle. The Uu DRX configuration may be adjusted to align with the SL DRX configuration based on at least one available Uu DRX configuration of the list of available Uu DRX configurations. The list of the available Uu DRX configurations may be based on a suitability of each of the available Uu DRX configurations. The SL DRX configuration may be based on the one or more existing SL DRX configurations and a capability of the UE, and the SL DRX configuration may not overlap with the one or more existing SL DRX configurations. The at least one suitable SL DRX configuration for the UE may be aligned with the current Uu DRX configuration of the UE. In some aspects, the indication of the assistance information may be received via layer 3 (L3) signaling or a radio resource control (RRC) message. Also, the indication of the assistance information may be received via layer 1 (L1) signaling, layer 2 (L2) signaling, or a medium access control (MAC) control element (MAC-CE).

At 1404, the base station may configure the SL DRX configuration and the Uu DRX configuration based on the indication of the assistance information, as described in connection with the examples in FIGS. 4-11. For example, base station 1104 may configure the SL DRX configuration and the Uu DRX configuration based on the indication of the assistance information, as described in connection with 1140 in FIG. 11. Further, 1404 may be performed by determination component 1740 in FIG. 17.

At 1406, the base station may transmit, to the UE, an indication of the SL DRX configuration and an indication of the Uu DRX configuration, as described in connection with the examples in FIGS. 4-11. For example, base station 1104 may transmit, to the UE, an indication of the SL DRX configuration and an indication of the Uu DRX configuration, as described in connection with 1150 in FIG. 11. Further, 1406 may be performed by determination component 1740 in FIG. 17.

In some instances, the indication of the Uu DRX configuration and the indication of the SL DRX configuration may be transmitted via layer 3 (L3) signaling or a radio resource control (RRC) message. Also, the indication of the Uu DRX configuration and the indication of the SL DRX configuration may be transmitted via layer 1 (L1) signaling, layer 2 (L2) signaling, or a medium access control (MAC) control element (MAC-CE). Further, the indication of the SL DRX configuration may include one or more SL DRX parameters associated with an alignment of the Uu DRX configuration and the SL DRX configuration. The one or more SL DRX parameters may include at least one of: an SL DRX cycle, an SL DRX starting offset, or an SL DRX slot offset. Further, the indication of the Uu DRX configuration may include one or more Uu DRX parameters associated with an alignment of the Uu DRX configuration and the SL DRX configuration. The one or more Uu DRX parameters may include at least one of: a Uu DRX long cycle, a starting offset for the Uu DRX long cycle, a Uu DRX short cycle, a timer for the Uu DRX short cycle, or a Uu DRX slot offset.

Figure 15:
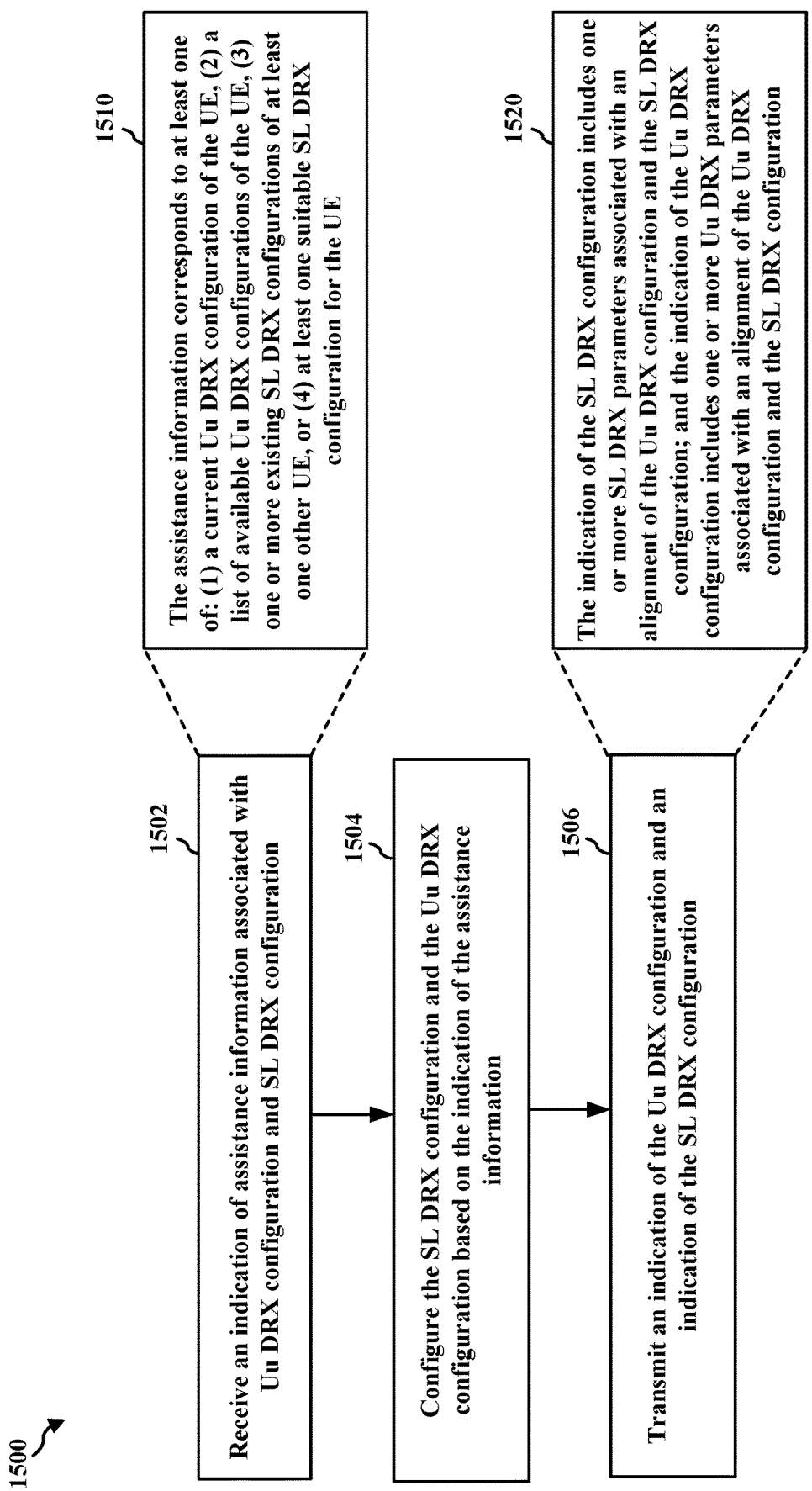
FIG. 15 is a flowchart of a method of wireless communication.

FIG. 15 is a flowchart 1500 of a method of wireless communication. The method may be performed by a base station or a component of a base station (e.g., the base station 102, 180, 310, 610, 612, 902, 908, 1104; the apparatus 1702). The methods described herein may provide a number of benefits, such as improving communication signaling, resource utilization, and/or power savings.

At 1502, the base station may receive, from a user equipment (UE), an indication of assistance information associated with a UE-universal mobile telecommunications system terrestrial radio access network (UTRAN) (Uu) discontinuous reception (DRX) configuration and a sidelink (SL) DRX configuration, as described in connection with the examples in FIGS. 4-11. For example, base station 1104 may receive, from a user equipment (UE), an indication of assistance information associated with a UE-universal mobile telecommunications system terrestrial radio access network (UTRAN) (Uu) discontinuous reception (DRX) configuration and a sidelink (SL) DRX configuration, as described in connection with 1130 in FIG. 11. Further, 1502 may be performed by determination component 1740 in FIG. 17.

As shown at 1510, the assistance information associated with the Uu DRX configuration and the SL DRX configuration may correspond to at least one of: (1) a current Uu DRX configuration of the UE, (2) a list of available Uu DRX configurations of the UE, (3) one or more existing SL DRX configurations of at least one other UE, or (4) at least one suitable SL DRX configuration for the UE. The list of the available Uu DRX configurations may include all of the available Uu DRX configurations or a subset of the available Uu DRX configurations. The current Uu DRX configuration may be associated with a long DRX cycle, a short DRX cycle, a DRX slot offset, or a starting offset of the long DRX cycle. The Uu DRX configuration may be adjusted to align with the SL DRX configuration based on at least one available Uu DRX configuration of the list of available Uu DRX configurations. The list of the available Uu DRX configurations may be based on a suitability of each of the available Uu DRX configurations. The SL DRX configuration may be based on the one or more existing SL DRX configurations and a capability of the UE, and the SL DRX configuration may not overlap with the one or more existing SL DRX configurations. The at least one suitable SL DRX configuration for the UE may be aligned with the current Uu DRX configuration of the UE. In some aspects, the indication of the assistance information may be received via layer 3 (L3) signaling or a radio resource control (RRC) message. Also, the indication of the assistance information may be received via layer 1 (L1) signaling, layer 2 (L2) signaling, or a medium access control (MAC) control element (MAC-CE).

At 1504, the base station may configure the SL DRX configuration and the Uu DRX configuration based on the indication of the assistance information, as described in connection with the examples in FIGS. 4-11. For example, base station 1104 may configure the SL DRX configuration and the Uu DRX configuration based on the indication of the assistance information, as described in connection with 1140 in FIG. 11. Further, 1504 may be performed by determination component 1740 in FIG. 17.

At 1506, the base station may transmit, to the UE, an indication of the SL DRX configuration and an indication of the Uu DRX configuration, as described in connection with the examples in FIGS. 4-11. For example, base station 1104 may transmit, to the UE, an indication of the SL DRX configuration and an indication of the Uu DRX configuration, as described in connection with 1150 in FIG. 11. Further, 1506 may be performed by determination component 1740 in FIG. 17.

In some instances, the indication of the Uu DRX configuration and the indication of the SL DRX configuration may be transmitted via layer 3 (L3) signaling or a radio resource control (RRC) message. Also, the indication of the Uu DRX configuration and the indication of the SL DRX configuration may be transmitted via layer 1 (L1) signaling, layer 2 (L2) signaling, or a medium access control (MAC) control element (MAC-CE). As shown at 1520, the indication of the SL DRX configuration may include one or more SL DRX parameters associated with an alignment of the Uu DRX configuration and the SL DRX configuration. The one or more SL DRX parameters may include at least one of: an SL DRX cycle, an SL DRX starting offset, or an SL DRX slot offset. As further shown at 1520, the indication of the Uu DRX configuration may include one or more Uu DRX parameters associated with an alignment of the Uu DRX configuration and the SL DRX configuration. The one or more Uu DRX parameters may include at least one of: a Uu DRX long cycle, a starting offset for the Uu DRX long cycle, a Uu DRX short cycle, a timer for the Uu DRX short cycle, or a Uu DRX slot offset.

Figure 16:
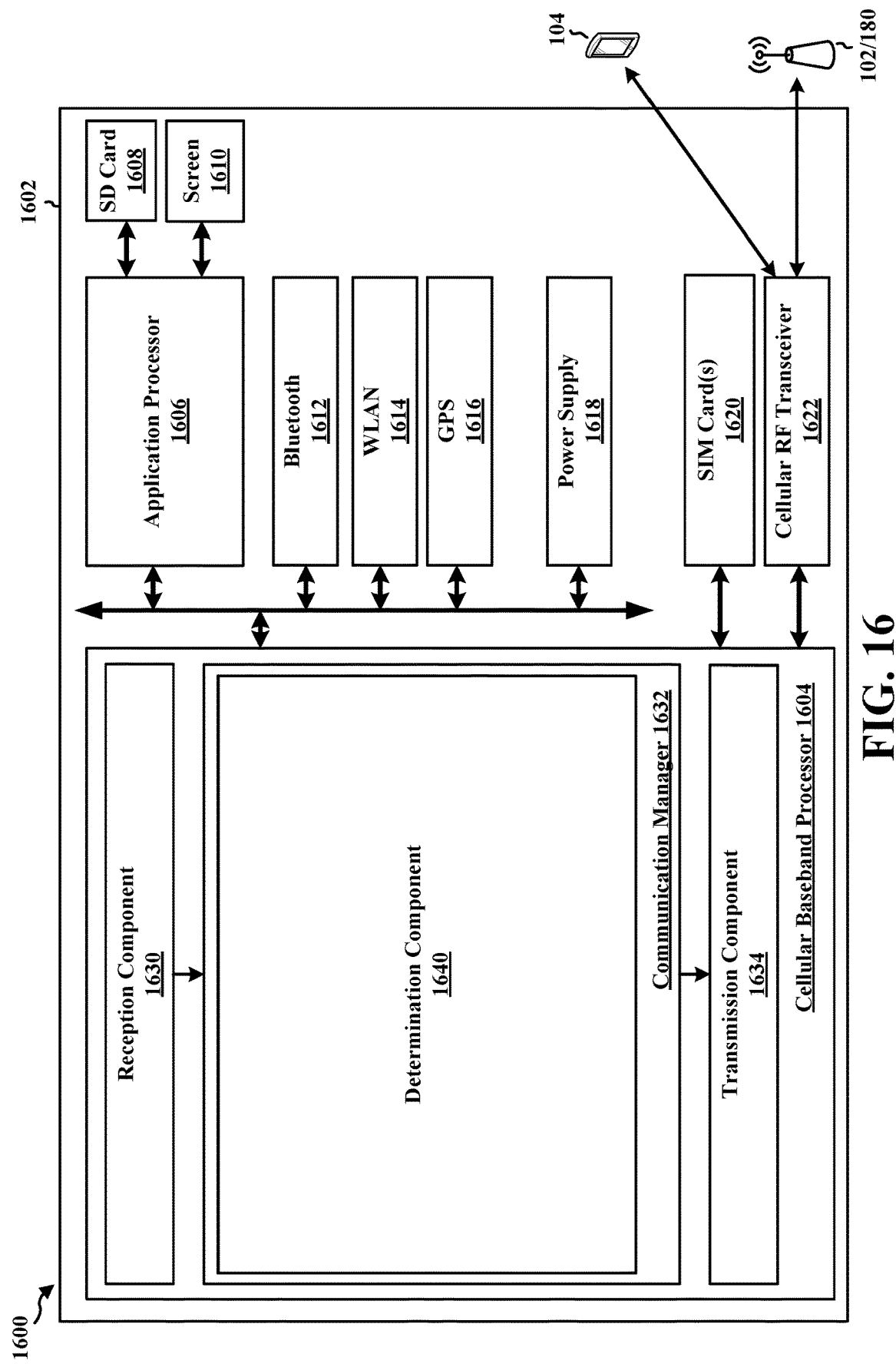
FIG. 16 is a diagram illustrating an example of a hardware implementation for an example apparatus.

FIG. 16 is a diagram 1600 illustrating an example of a hardware implementation for an apparatus 1602. The apparatus 1602 may be a UE, a component of a UE, or may implement UE functionality. In some aspects, the apparatus 1602 may include a cellular baseband processor 1604 (also referred to as a modem) coupled to a cellular RF transceiver 1622. In some aspects, the apparatus 1602 may further include one or more subscriber identity modules (SIM) cards 1620, an application processor 1606 coupled to a secure digital (SD) card 1608 and a screen 1610, a Bluetooth module 1612, a wireless local area network (WLAN) module 1614, a Global Positioning System (GPS) module 1616, or a power supply 1618. The cellular baseband processor 1604 communicates through the cellular RF transceiver 1622 with the UE 104 and/or BS 102/180. The cellular baseband processor 1604 may include a computer-readable medium/memory. The computer-readable medium/memory may be non-transitory. The cellular baseband processor 1604 is responsible for general processing, including the execution of software stored on the computer-readable medium/memory. The software, when executed by the cellular baseband processor 1604, causes the cellular baseband processor 1604 to perform the various functions described supra. The computer-readable medium/memory may also be used for storing data that is manipulated by the cellular baseband processor 1604 when executing software. The cellular baseband processor 1604 further includes a reception component 1630, a communication manager 1632, and a transmission component 1634. The communication manager 1632 includes the one or more illustrated components. The components within the communication manager 1632 may be stored in the computer-readable medium/memory and/or configured as hardware within the cellular baseband processor 1604. The cellular baseband processor 1604 may be a component of the UE 350 and may include the memory 360 and/or at least one of the TX processor 368, the RX processor 356, and the controller/processor 359. In one configuration, the apparatus 1602 may be a modem chip and include just the baseband processor 1604, and in another configuration, the apparatus 1602 may be the entire UE (e.g., see 350 of FIG. 3) and include the additional modules of the apparatus 1602.

The communication manager 1632 includes a determination component 1640 that is configured to receive a first indication of assistance information associated with a UE-universal mobile telecommunications system terrestrial radio access network (UTRAN) (Uu) discontinuous reception (DRX) configuration and a sidelink (SL) DRX configuration, e.g., as described in connection with step 1202 above. Determination component 1640 may also be configured to transmit a second indication of the assistance information associated with the Uu DRX configuration and the SL DRX configuration, e.g., as described in connection with step 1204 above. Determination component 1640 may also be configured to receive an indication of the Uu DRX configuration and an indication of the SL DRX configuration, e.g., as described in connection with step 1206 above.

The apparatus may include additional components that perform each of the blocks of the algorithm in the flowcharts of FIGS. 11-13. As such, each block in the flowcharts of FIGS. 11-13 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

As shown, the apparatus 1602 may include a variety of components configured for various functions. In one configuration, the apparatus 1602, and in particular the cellular baseband processor 1604, includes means for receiving a first indication of assistance information associated with a UE-universal mobile telecommunications system terrestrial radio access network (UTRAN) (Uu) discontinuous reception (DRX) configuration and a sidelink (SL) DRX configuration; means for transmitting a second indication of the assistance information associated with the Uu DRX configuration and the SL DRX configuration; and means for receiving an indication of the Uu DRX configuration and an indication of the SL DRX configuration. The means may be one or more of the components of the apparatus 1602 configured to perform the functions recited by the means. As described supra, the apparatus 1602 may include the TX Processor 368, the RX Processor 356, and the controller/processor 359. As such, in one configuration, the means may be the TX Processor 368, the RX Processor 356, and the controller/processor 359 configured to perform the functions recited by the means.

Figure 17:
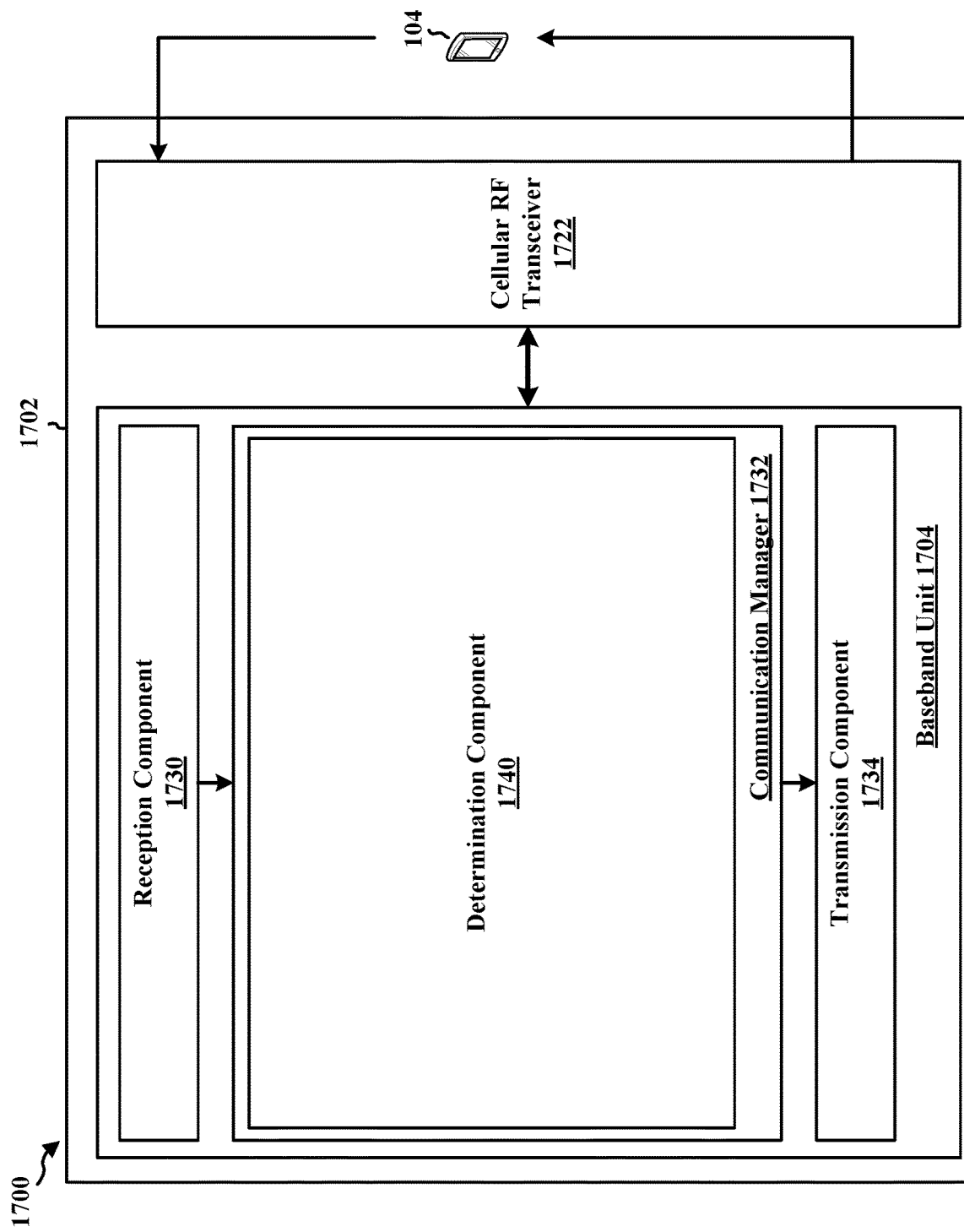
FIG. 17 is a diagram illustrating an example of a hardware implementation for an example apparatus.

FIG. 17 is a diagram 1700 illustrating an example of a hardware implementation for an apparatus 1702. The apparatus 1702 may be a base station, a component of a base station, or may implement base station functionality. In some aspects, the apparatus 1702 may include a baseband unit 1704. The baseband unit 1704 may communicate through a cellular RF transceiver 1722 with the UE 104. The baseband unit 1704 may include a computer-readable medium/memory. The baseband unit 1704 is responsible for general processing, including the execution of software stored on the computer-readable medium/memory. The software, when executed by the baseband unit 1704, causes the baseband unit 1704 to perform the various functions described supra. The computer-readable medium/memory may also be used for storing data that is manipulated by the baseband unit 1704 when executing software. The baseband unit 1704 further includes a reception component 1730, a communication manager 1732, and a transmission component 1734. The communication manager 1732 includes the one or more illustrated components. The components within the communication manager 1732 may be stored in the computer-readable medium/memory and/or configured as hardware within the baseband unit 1704. The baseband unit 1704 may be a component of the base station 310 and may include the memory 376 and/or at least one of the TX processor 316, the RX processor 370, and the controller/processor 375.

The communication manager 1732 includes a determination component 1740 that is configured to receive, from a user equipment (UE), an indication of assistance information associated with a UE-universal mobile telecommunications system terrestrial radio access network (UTRAN) (Uu) discontinuous reception (DRX) configuration and a sidelink (SL) DRX configuration, e.g., as described in connection with step 1402 above. Determination component 1740 may also be configured to configure the SL DRX configuration and the Uu DRX configuration based on the indication of the assistance information, e.g., as described in connection with step 1404 above. Determination component 1740 may also be configured to transmit, to the UE, an indication of the SL DRX configuration and an indication of the Uu DRX configuration, e.g., as described in connection with step 1406 above.

The apparatus may include additional components that perform each of the blocks of the algorithm in the flowcharts of FIGS. 11, 14, and 15. As such, each block in the flowcharts of FIGS. 11, 14, and 15 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

As shown, the apparatus 1702 may include a variety of components configured for various functions. In one configuration, the apparatus 1702, and in particular the baseband unit 1704, includes means for receiving, from a user equipment (UE), an indication of assistance information associated with a UE-universal mobile telecommunications system terrestrial radio access network (UTRAN) (Uu) discontinuous reception (DRX) configuration and a sidelink (SL) DRX configuration; means for configuring the SL DRX configuration and the Uu DRX configuration based on the indication of the assistance information; and means for transmitting, to the UE, an indication of the SL DRX configuration and an indication of the Uu DRX configuration. The means may be one or more of the components of the apparatus 1702 configured to perform the functions recited by the means. As described supra, the apparatus 1702 may include the TX Processor 316, the RX Processor 370, and the controller/processor 375. As such, in one configuration, the means may be the TX Processor 316, the RX Processor 370, and the controller/processor 375 configured to perform the functions recited by the means.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Terms such as "if," "when," and "while" should be interpreted to mean "under the condition that" rather than imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

The following aspects are illustrative only and may be combined with other aspects or teachings described herein, without limitation.

Aspect 1 is an apparatus for wireless communication at a UE including at least one processor coupled to a memory and configured to: receive a first indication of assistance information associated with a UE-universal mobile telecommunications system terrestrial radio access network (UTRAN) (Uu) discontinuous reception (DRX) configuration and a sidelink (SL) DRX configuration; transmit a second indication of the assistance information associated with the Uu DRX configuration and the SL DRX configuration; and receive an indication of the Uu DRX configuration and an indication of the SL DRX configuration.

Aspect 2 is the apparatus of aspect 1, where the first indication is received from a base station and the second indication is transmitted to at least one other UE.

Aspect 3 is the apparatus of any of aspects 1 and 2, where the indication of the SL DRX configuration is received from at least one other UE and the indication of the Uu DRX configuration is received from a base station.

Aspect 4 is the apparatus of any of aspects 1 to 3, where the first indication is received from at least one other UE and the second indication is transmitted to a base station.

Aspect 5 is the apparatus of any of aspects 1 to 4, where the indication of the Uu DRX configuration and the indication of the SL DRX configuration are received from a base station.

Aspect 6 is the apparatus of any of aspects 1 to 5, where the first indication is received via layer 3 (L3) signaling or a radio resource control (RRC) message, and where the second indication is transmitted via the L3 signaling or the RRC message.

Aspect 7 is the apparatus of any of aspects 1 to 6, where the indication of the Uu DRX configuration and the indication of the SL DRX configuration are received via layer 3 (L3) signaling or a radio resource control (RRC) message.

Aspect 8 is the apparatus of any of aspects 1 to 7, where the first indication is received via layer 1 (L1) signaling, layer 2 (L2) signaling, or a medium access control (MAC) control element (MAC-CE), and where the second indication is transmitted via the L1 signaling, the L2 signaling, or the MAC-CE.

Aspect 9 is the apparatus of any of aspects 1 to 8, where the indication of the Uu DRX configuration and the indication of the SL DRX configuration are received via layer 1 (L1) signaling, layer 2 (L2) signaling, or a medium access control (MAC) control element (MAC-CE).

Aspect 10 is the apparatus of any of aspects 1 to 9, where the assistance information associated with the Uu DRX configuration and the SL DRX configuration corresponds to at least one of: (1) a current Uu DRX configuration of the UE, (2) a list of available Uu DRX configurations of the UE, (3) one or more existing SL DRX configurations of at least one other UE, or (4) at least one suitable SL DRX configuration for the UE.

Aspect 11 is the apparatus of any of aspects 1 to 10, where the list of the available Uu DRX configurations includes all of the available Uu DRX configurations or a subset of the available Uu DRX configurations.

Aspect 12 is the apparatus of any of aspects 1 to 11, where the current Uu DRX configuration is associated with a long DRX cycle, a short DRX cycle, a DRX slot offset, or a starting offset of the long DRX cycle.

Aspect 13 is the apparatus of any of aspects 1 to 12, where the Uu DRX configuration is adjusted to align with the SL DRX configuration based on at least one available Uu DRX configuration of the list of available Uu DRX configurations.

Aspect 14 is the apparatus of any of aspects 1 to 13, where the list of the available Uu DRX configurations is based on a suitability of each of the available Uu DRX configurations.

Aspect 15 is the apparatus of any of aspects 1 to 14, where the SL DRX configuration is based on the one or more existing SL DRX configurations and a capability of the UE, and where the SL DRX configuration does not overlap with the one or more existing SL DRX configurations.

Aspect 16 is the apparatus of any of aspects 1 to 15, where the at least one suitable SL DRX configuration for the UE is aligned with the current Uu DRX configuration of the UE.

Aspect 17 is the apparatus of any of aspects 1 to 16, where the indication of the SL DRX configuration includes one or more SL DRX parameters associated with an alignment of the Uu DRX configuration and the SL DRX configuration.

Aspect 18 is the apparatus of any of aspects 1 to 17, where the one or more SL DRX parameters include at least one of: an SL DRX cycle, an SL DRX starting offset, or an SL DRX slot offset.

Aspect 19 is the apparatus of any of aspects 1 to 18, where the indication of the Uu DRX configuration includes one or more Uu DRX parameters associated with an alignment of the Uu DRX configuration and the SL DRX configuration.

Aspect 20 is the apparatus of any of aspects 1 to 19, where the one or more Uu DRX parameters include at least one of: a Uu DRX long cycle, a starting offset for the Uu DRX long cycle, a Uu DRX short cycle, a timer for the Uu DRX short cycle, or a Uu DRX slot offset.

Aspect 21 is the apparatus of any of aspects 1 to 20, further including a transceiver or an antenna coupled to the at least one processor.

Aspect 22 is a method of wireless communication for implementing any of aspects 1 to 21.

Aspect 23 is an apparatus for wireless communication including means for implementing any of aspects 1 to 21.

Aspect 24 is a computer-readable medium storing computer executable code, where the code when executed by a processor causes the processor to implement any of aspects 1 to 21.

Aspect 25 is an apparatus for wireless communication at a base station including at least one processor coupled to a memory and configured to: receive, from a user equipment (UE), an indication of assistance information associated with a UE-universal mobile telecommunications system terrestrial radio access network (UTRAN) (Uu) discontinuous reception (DRX) configuration and a sidelink (SL) DRX configuration; configure the SL DRX configuration and the Uu DRX configuration based on the indication of the assistance information; and transmit, to the UE, an indication of the SL DRX configuration and an indication of the Uu DRX configuration.

Aspect 26 is the apparatus of aspect 25, where the indication of the assistance information is received via layer 3 (L3) signaling or a radio resource control (RRC) message.

Aspect 27 is the apparatus of any of aspects 25 and 26, where the indication of the Uu DRX configuration and the indication of the SL DRX configuration are transmitted via layer 3 (L3) signaling or a radio resource control (RRC) message.

Aspect 28 is the apparatus of any of aspects 25 to 27, where the indication of the assistance information is received via layer 1 (L1) signaling, layer 2 (L2) signaling, or a medium access control (MAC) control element (MAC-CE).

Aspect 29 is the apparatus of any of aspects 25 to 28, where the indication of the Uu DRX configuration and the indication of the SL DRX configuration are transmitted via layer 1 (L1) signaling, layer 2 (L2) signaling, or a medium access control (MAC) control element (MAC-CE).

Aspect 30 is the apparatus of any of aspects 25 to 29, where the assistance information associated with the Uu DRX configuration and the SL DRX configuration corresponds to at least one of: (1) a current Uu DRX configuration of the UE, (2) a list of available Uu DRX configurations of the UE, (3) one or more existing SL DRX configurations of at least one other UE, or (4) at least one suitable SL DRX configuration for the UE.

Aspect 31 is the apparatus of any of aspects 25 to 30, where the list of the available Uu DRX configurations includes all of the available Uu DRX configurations or a subset of the available Uu DRX configurations.

Aspect 32 is the apparatus of any of aspects 25 to 31, where the current Uu DRX configuration is associated with a long DRX cycle, a short DRX cycle, a DRX slot offset, or a starting offset of the long DRX cycle.

Aspect 33 is the apparatus of any of aspects 25 to 32, where the Uu DRX configuration is adjusted to align with the SL DRX configuration based on at least one available Uu DRX configuration of the list of available Uu DRX configurations.

Aspect 34 is the apparatus of any of aspects 25 to 33, where the list of the available Uu DRX configurations is based on a suitability of each of the available Uu DRX configurations.

Aspect 35 is the apparatus of any of aspects 25 to 34, where the SL DRX configuration is based on the one or more existing SL DRX configurations and a capability of the UE, and where the SL DRX configuration does not overlap with the one or more existing SL DRX configurations.

Aspect 36 is the apparatus of any of aspects 25 to 35, where the at least one suitable SL DRX configuration for the UE is aligned with the current Uu DRX configuration of the UE.

Aspect 37 is the apparatus of any of aspects 25 to 36, where the indication of the SL DRX configuration includes one or more SL DRX parameters associated with an alignment of the Uu DRX configuration and the SL DRX configuration.

Aspect 38 is the apparatus of any of aspects 25 to 37, where the one or more SL DRX parameters include at least one of: an SL DRX cycle, an SL DRX starting offset, or an SL DRX slot offset.

Aspect 39 is the apparatus of any of aspects 25 to 38, where the indication of the Uu DRX configuration includes one or more Uu DRX parameters associated with an alignment of the Uu DRX configuration and the SL DRX configuration.

Aspect 40 is the apparatus of any of aspects 25 to 39, where the one or more Uu DRX parameters include at least one of: a Uu DRX long cycle, a starting offset for the Uu DRX long cycle, a Uu DRX short cycle, a timer for the Uu DRX short cycle, or a Uu DRX slot offset.

Aspect 41 is the apparatus of any of aspects 25 to 40, further including a transceiver or an antenna coupled to the at least one processor.

Aspect 42 is a method of wireless communication for implementing any of aspects 25 to 41.

Aspect 43 is an apparatus for wireless communication including means for implementing any of aspects 25 to 41.

Aspect 44 is a computer-readable medium storing computer executable code, where the code when executed by a processor causes the processor to implement any of aspects 25 to 41.

What is claimed is:

1. An apparatus for wireless communication at a user equipment (UE), comprising:
   memory; and
   at least one processor coupled to the memory and configured to:
      receive a first indication of assistance information associated with a UE-universal mobile telecommunications system terrestrial radio access network (UTRAN) (Uu) discontinuous reception (DRX) configuration and a sidelink (SL) DRX configuration;
      transmit a second indication of the assistance information associated with the Uu DRX configuration and the SL DRX configuration, wherein the assistance information comprises one or more existing SL DRX configurations of at least one other UE; and
      receive an indication of the Uu DRX configuration and an indication of the SL DRX configuration, wherein the SL DRX configuration is based on the one or more existing SL DRX configurations and a capability of the UE, and wherein the SL DRX configuration does not overlap with the one or more existing SL DRX configurations.

2. The apparatus of claim 1, wherein to receive the first indication, the at least one processor is configured to receive the first indication from a base station, and wherein to transmit the second indication, the at least one processor is configured to transmit the second indication to the at least one other UE.

3. The apparatus of claim 1, wherein to receive the indication of the SL DRX configuration, the at least one processor is configured to receive the indication of the SL DRX configuration from at least one other UE, and wherein to receive the indication of the Uu DRX configuration, the at least one processor is configured to receive the indication of the Uu DRX configuration from a base station.

4. The apparatus of claim 1, wherein to receive the first indication, the at least one processor is configured to receive the first indication from the at least one other UE, and wherein to transmit the second indication, the at least one processor is configured to transmit the second indication to a base station.

5. The apparatus of claim 1, wherein to receive the indication of the Uu DRX configuration and the indication of the SL DRX configuration, the at least one processor is configured to receive the indication of the Uu DRX configuration and the indication of the SL DRX configuration from a base station.

6. The apparatus of claim 1, wherein to receive the first indication, the at least one processor is configured to receive the first indication via layer 3 (L3) signaling or a radio resource control (RRC) message, and wherein to transmit the second indication, the at least one processor is configured to transmit the second indication via the L3 signaling or the RRC message.

7. The apparatus of claim 1, wherein to receive the indication of the Uu DRX configuration and the indication of the SL DRX configuration, the at least one processor is configured to receive the indication of the Uu DRX configuration and the indication of the SL DRX configuration via layer 3 (L3) signaling or a radio resource control (RRC) message.

8. The apparatus of claim 1, wherein to receive the first indication, the at least one processor is configured to receive the first indication via layer 1 (L1) signaling, layer 2 (L2) signaling, or a medium access control (MAC) control element (MAC-CE), and wherein to transmit the second indication, the at least one processor is configured to transmit the second indication via the L1 signaling, the L2 signaling, or the MAC-CE.

9. The apparatus of claim 1, wherein to receive the indication of the Uu DRX configuration and the indication of the SL DRX configuration, the at least one processor is configured to receive the indication of the Uu DRX configuration and the indication of the SL DRX configuration via layer 1 (L1) signaling, layer 2 (L2) signaling, or a medium access control (MAC) control element (MAC-CE).

10. The apparatus of claim 1, wherein the assistance information associated with the Uu DRX configuration and the SL DRX configuration corresponds to at least one of: (1) a current Uu DRX configuration of the UE, (2) a list of available Uu DRX configurations of the UE, (3) the one or more existing SL DRX configurations of the at least one other UE, or (4) at least one suitable SL DRX configuration for the UE.

11. The apparatus of claim 10, wherein the list of the available Uu DRX configurations includes all of the available Uu DRX configurations or a subset of the available Uu DRX configurations.

12. The apparatus of claim 10, wherein the current Uu DRX configuration is associated with a long DRX cycle, a short DRX cycle, a DRX slot offset, or a starting offset of the long DRX cycle.

13. The apparatus of claim 10, wherein the Uu DRX configuration is configured to align with the SL DRX configuration based on at least one available Uu DRX configuration of the list of available Uu DRX configurations.

14. The apparatus of claim 10, wherein the list of the available Uu DRX configurations is based on a suitability of each of the available Uu DRX configurations.

15. The apparatus of claim 10, wherein the at least one suitable SL DRX configuration for the UE is aligned with the current Uu DRX configuration of the UE.

16. The apparatus of claim 1, wherein the indication of the SL DRX configuration includes one or more SL DRX parameters associated with an alignment of the Uu DRX configuration and the SL DRX configuration.

17. The apparatus of claim 16, wherein the one or more SL DRX parameters include at least one of: an SL DRX cycle, an SL DRX starting offset, or an SL DRX slot offset.

18. The apparatus of claim 1, wherein the indication of the Uu DRX configuration includes one or more Uu DRX parameters associated with an alignment of the Uu DRX configuration and the SL DRX configuration.

19. The apparatus of claim 18, further comprising a transceiver or an antenna coupled to the at least one processor, wherein the one or more Uu DRX parameters include at least one of: a Uu DRX long cycle, a starting offset for the Uu DRX long cycle, a Uu DRX short cycle, a timer for the Uu DRX short cycle, or a Uu DRX slot offset.

20. A method of wireless communication at a user equipment (UE), comprising:
   receiving a first indication of assistance information associated with a UE-universal mobile telecommunications system terrestrial radio access network (UTRAN) (Uu)

discontinuous reception (DRX) configuration and a sidelink (SL) DRX configuration;

transmitting a second indication of the assistance information associated with the Uu DRX configuration and the SL DRX configuration, wherein the assistance information comprises one or more existing SL DRX configurations of at least one other UE; and receiving an indication of the Uu DRX configuration and an indication of the SL DRX configuration, wherein the SL DRX configuration is based on the one or more existing SL DRX configurations and a capability of the UE, and wherein the SL DRX configuration does not overlap with the one or more existing SL DRX configurations.

21. An apparatus for wireless communication at a base station, comprising:

memory; and at least one processor coupled to the memory and configured to:

receive, from a user equipment (UE), an indication of assistance information associated with a UE-universal mobile telecommunications system terrestrial radio access network (UTRAN) (Uu) discontinuous reception (DRX) configuration and a sidelink (SL) DRX configuration, wherein the assistance information comprises one or more existing SL DRX configurations of at least one other UE;

configure the SL DRX configuration and the Uu DRX configuration based on the indication of the assistance information, wherein the SL DRX configuration is based on the one or more existing SL DRX configurations and a capability of the UE, and wherein the SL DRX configuration does not overlap with the one or more existing SL DRX configurations; and transmit, to the UE, an indication of the SL DRX configuration and an indication of the Uu DRX configuration.

22. The apparatus of claim 21, wherein to receive the indication of the assistance information, the at least one processor is configured to receive the indication of the assistance information via layer 3 (L3) signaling, a radio resource control (RRC) message, layer 1 (L1) signaling, layer 2 (L2) signaling, or a medium access control (MAC) control element (MAC-CE).

23. The apparatus of claim 21, wherein to transmit the indication of the Uu DRX configuration and the indication of the SL DRX configuration the at least one processor is configured to transmit the indication of the Uu DRX configuration and the indication of the SL DRX configuration via layer 3 (L3) signaling, a radio resource control (RRC) message, layer 1 (L1) signaling, layer 2 (L2) signaling, or a medium access control (MAC) control element (MAC-CE).

24. The apparatus of claim 21, wherein the assistance information associated with the Uu DRX configuration and the SL DRX configuration corresponds to at least one of: (1) a current Uu DRX configuration of the UE, (2) a list of available Uu DRX configurations of the UE, (3) the one or more existing SL DRX configurations of the at least one other UE, or (4) at least one suitable SL DRX configuration for the UE.

25. The apparatus of claim 24, wherein the list of the available Uu DRX configurations includes all of the available Uu DRX configurations or a subset of the available Uu DRX configurations, wherein the current Uu DRX configuration is associated with a long DRX cycle, a short DRX cycle, a DRX slot offset, or a starting offset of the long DRX cycle, or wherein the Uu DRX configuration is adjusted to align with the SL DRX configuration based on at least one available Uu DRX configuration of the list of available Uu DRX configurations.

26. The apparatus of claim 24, wherein the list of the available Uu DRX configurations is based on a suitability of each of the available Uu DRX configurations, wherein the SL DRX configuration is based on the one or more existing SL DRX configurations and a capability of the UE, and wherein the SL DRX configuration does not overlap with the one or more existing SL DRX configurations, or wherein the at least one suitable SL DRX configuration for the UE is aligned with the current Uu DRX configuration of the UE.

27. The apparatus of claim 21, wherein the indication of the SL DRX configuration includes one or more SL DRX parameters associated with an alignment of the Uu DRX configuration and the SL DRX configuration, wherein the one or more SL DRX parameters include at least one of: an SL DRX cycle, an SL DRX starting offset, or an SL DRX slot offset.

28. The apparatus of claim 21, further comprising a transceiver or an antenna coupled to the at least one processor, wherein the indication of the Uu DRX configuration includes one or more Uu DRX parameters associated with an alignment of the Uu DRX configuration and the SL DRX configuration, wherein the one or more Uu DRX parameters include at least one of: a Uu DRX long cycle, a starting offset for the Uu DRX long cycle, a Uu DRX short cycle, a timer for the Uu DRX short cycle, or a Uu DRX slot offset.

29. A method of wireless communication at a base station, comprising:

receiving, from a user equipment (UE), an indication of assistance information associated with a UE-universal mobile telecommunications system terrestrial radio access network (UTRAN) (Uu) discontinuous reception (DRX) configuration and a sidelink (SL) DRX configuration, wherein the assistance information comprises one or more existing SL DRX configurations of at least one other UE;

configuring the SL DRX configuration and the Uu DRX configuration based on the indication of the assistance information, wherein the SL DRX configuration is based on the one or more existing SL DRX configurations and a capability of the UE, and wherein the SL DRX configuration does not overlap with the one or more existing SL DRX configurations; and transmitting, to the UE, an indication of the SL DRX configuration and an indication of the Uu DRX configuration.

* * * * *